(12) United States Patent
Chiba

(10) Patent No.: US 10,541,888 B2
(45) Date of Patent: *Jan. 21, 2020

(54) NETWORK SYSTEM, NETWORK CONTROL METHOD, AND CONTROL APPARATUS

(71) Applicant: NEC CORPORATION, Tokyo (JP)

(72) Inventor: Yasunobu Chiba, Tokyo (JP)

(73) Assignee: NEC CORPORATION, Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 15/560,775

(22) PCT Filed: Mar. 14, 2016

(86) PCT No.: PCT/JP2016/001435
§ 371 (c)(1),
(2) Date: Sep. 22, 2017

(87) PCT Pub. No.: WO2016/152083
PCT Pub. Date: Sep. 29, 2016

(65) Prior Publication Data
US 2018/0083847 A1 Mar. 22, 2018

(30) Foreign Application Priority Data
Mar. 24, 2015 (JP) .................. 2015-061745

(51) Int. Cl.
*H04L 12/715* (2013.01)
*H04L 12/26* (2006.01)
*H04L 29/06* (2006.01)

(52) U.S. Cl.
CPC ............ *H04L 43/028* (2013.01); *H04L 69/22* (2013.01)

(58) Field of Classification Search
CPC . H04L 45/64; H04L 61/2592; H04L 49/3009; H04L 45/745; H04L 45/72; H04L 43/028; H04L 41/5054; H04L 69/22
See application file for complete search history.

(56) References Cited

U.S. PATENT DOCUMENTS 8,339,954 B2 * 12/2012 Dahod ................... H04L 47/10
370/231
9,258,254 B2 * 2/2016 Srinivasan .......... H04L 49/3009
(Continued)

FOREIGN PATENT DOCUMENTS

JP 2006-311416 A 11/2006
JP 2012-175418 A 9/2012

OTHER PUBLICATIONS

Network Functions Virtualization (NVF), "Network Operator Perspectives on Industry Progress", Oct. 15-17, 2013 at the "SDN and OpenFlow World Congress", Frankfurt—Germany, pp. 1-16, Issue 1.

(Continued)

*Primary Examiner* — Kibrom T Hailu
(74) *Attorney, Agent, or Firm* — Sughrue Mion, PLLC

(57) ABSTRACT

A network system, a network control method, and a control apparatus are provided that can easily achieve assurance of the quality of a network service and optimization of the throughput of an entire system. A network control apparatus (10) controls a network (20) having a multi-layer structure, monitors whether or not a network service on a first layer fulfills a required service level, and depending on a result of the monitoring, changes a setting of a packet header so that resources on the first layer will be changed, wherein resources on the lower layer are changed in accordance with a change in the setting of the packet header.

12 Claims, 20 Drawing Sheets

(56) References Cited

U.S. PATENT DOCUMENTS

| | | | |
|---|---|---|---|
| 2010/0128742 A1* | 5/2010 | Chun | H04L 12/1886 |
| | | | 370/474 |
| 2014/0112349 A1* | 4/2014 | Moreno | H04L 45/64 |
| | | | 370/400 |
| 2014/0317261 A1 | 10/2014 | Shatzkamer et al. | |
| 2015/0281099 A1* | 10/2015 | Banavalikar | H04L 12/4633 |
| | | | 370/230 |

OTHER PUBLICATIONS

ETSI GS NFV 001 v1.1.1, "Network Functions Virtualisation (NFV); Use Cases" Oct. 2013, 50 pages.

D. Thaler, et al., "Multipath Issues in Unicast and Multicast Next-Hop Selection", Network Working Group, Request for Comments: 2991, Nov. 2000, pp. 1-7.

C. Hopps, "Analysis of an Equal-Cost Multi-Path Algorithm", Network Working Group, Request for Comments: 2992, Nov. 2000, pp. 1-8.

Wenyu Shen, et al., "vConductor: An Enabler for Achieving Virtual Network Integration as a Service", Network and Service Virtualization, IEEE Communications Magazine, Feb., 2015, pp. 116-124, vol. 53, Iss. 2.

Yasunobu Chiba, et al., "Study on Management and Orchestration Function to Ensure Required Service Levels in NFV Environment", The Institute of Electronics, Information and Communication Engineers, IEICE Technical Report, Feb. 27, 2014, pp. 409-414, vol. 113, No. 472.

International Search Report for PCT/JP2016/001435 dated Apr. 19, 2016 [PCT/ISA/210].

* cited by examiner

NETWORK SYSTEM, NETWORK CONTROL METHOD, AND CONTROL APPARATUS

TECHNICAL FIELD

The present invention relates to a network system including virtual network functions, and more particularly to a method and an apparatus for controlling a network.

BACKGROUND ART

In current communication systems, various network functions (NFs) such as BRAS (Broadband Remote Access Server), NAT (Network Address Translation), router, firewall (FW: Firewall), and DPI (Deep Packet Inspection) are implemented by dedicated hardware equipment (appliances). Accordingly, when a network operator launches a new network service, the network operator is forced to introduce new dedicated hardware equipment and requires a lot of costs such as purchase expenses, installation spaces and the like for the equipment. In the light of such circumstances, studies have been made in recent years on a technology (Network Function Virtualization) that uses software to virtually execute network functions, which have been executed by hardware equipment (NPL 1). As an example of network service virtualization, PTL 1 discloses a method in which a plurality of virtual routers are constructed on a communication node apparatus, and resources for these virtual routers are dynamically allocated according to communication quality.

Moreover, another technology has also been studied in which a communication flow is made over a communication path through which a plurality of virtual network functions (VNFs) are combined, thereby providing various communication services (for example, see NPL 2).

In Virtualization of network functions, as illustrated in FIG. 1, a network service is configured and managed based on logical connections between virtual network functions VNF (Forwarding Graph). Here illustrated is a network service including three virtual network functions VNF#1 to VNF#3 in an overlay network.

The virtual network functions VNF#1 to VNF#3 in this forwarding graph are mapped to a path in an underlay network (physical layer network). For example, assuming that the virtual network functions VNF#1 to VNF#3 are individually implemented by virtual machines on physical servers SV1 and SV2, the following path may be selected: physical switch A-physical switch B-physical server SV1-physical switch B-physical server SV2-physical switch C, or another path may be selected. An algorithm for path selection at each node is discussed in, for example, NPLs 3 and 4.

CITATION LIST

Patent Literature

[PTL 1]
Japanese Patent Application Unexamined Publication No. 2012-175418

Non Patent Literature

[NPL 1]
Network Functions Virtualization—Update White Paper, Oct. 15-17, 2013 at the "SDN and OpenFlow World Congress", Frankfurt-Germany (http://portal.etsi.org/NFV/NFV_White_Pater2.pdf)

[NPL 2]
ETSI GS NFV 001 v1.1.1 (2013-10) "Network Functions Virtualisation (NFV); Use Cases" (http://docbox.etsi.org/ISG/NFV/Open/Published/gs_NFV001v010101p%20-%20Use%20Cases.pdf)

[NPL 3]
Network Working Group Request for Comments: 2991

[NPL 4]
Network Working Group Request for Comments: 2992

SUMMARY

Technical Problem

However, a forwarding graph is to express a logical configuration and is not to manage how the logical configuration is mapped to a lower layer network. On the other hand, service quality depends on the amount of resources, the status and the like of a lower layer, and therefore it is difficult to realize assurance of the quality of a network service without considering the lower layer. According to the above-mentioned PTL and NPLs, VNF deployment and a path between VNFs are managed, but it is not concerned what path is configured in the lower layer network. Management based on such a forwarding graph cannot optimize the throughput of an entire network.

Accordingly, an object of the present invention is to provide a network system, a network control method, and a control apparatus that can easily achieve assurance of the quality of a network service and optimization of the throughput of an entire system.

Solution to Problem

A network control apparatus according to the present invention is an apparatus for controlling a network having a multi-layer structure, characterized by including: a monitoring means for monitoring whether or not a network service on a first layer fulfills a required service level; and a control means for changing, depending on a result of the monitoring, a setting of a packet header so that resources on the first layer will be changed, wherein resources on a second layer, which is a lower layer than the first layer, are changed in accordance with a change in the setting of the packet header.

A network control method according to the present invention is a method for controlling a network having a multi-layer structure, characterized by including: by a monitoring means, monitoring whether or not a network service on a first layer fulfills a required service level; and by a control means, changing, depending on a result of the monitoring, a setting of a packet header so that resources on the first layer will be changed, wherein resources on a second layer, which is a lower layer than the first layer, are changed in accordance with a change in the setting of the packet header.

A network system according to the present invention includes: a network having a multi-layer structure; and a control apparatus for controlling the network, characterized in that the control apparatus monitors whether or not a network service on a first layer fulfills a required service level, and depending on a result of the monitoring, changes a setting of a packet header so that resources on the first layer will be changed, wherein resources on a second layer, which is a lower layer than the first layer, are changed in accordance with a change in the setting of the packet header.

A program according to the present invention is a program causing a computer to function as an apparatus for controlling a network having a multi-layer structure, characterized by causing the computer to implement: a function of monitoring whether or not a network service on a first layer fulfills a required service level; and a function of changing, depending on a result of the monitoring, a setting of a packet header so that resources on the first layer will be changed, and allowing resources on a second layer, which is a lower layer than the first layer, to change in accordance with a change in the setting of the packet header.

Advantageous Effects of Invention

According to the present invention, the setting of a packet header is changed depending on monitoring results so that a resource on a first layer will be changed, whereby it is possible to easily achieve assurance of the quality of a network service and optimization of the throughput of an entire system.

DETAILED DESCRIPTION

Outline of Exemplary Embodiments

According to exemplary embodiments of the present invention, the setting of a logical component in an overlay network is changed, whereby the allocation of a resource in an underlay network is indirectly changed. For example, the setting for encapsulation or labeling of a packet at an upper layer is changed, whereby all or part of the resources on a lower layer that are mapped to logical components in the overlay network can be changed, and it is thus possible to achieve assurance of the quality of a network service and optimization of the throughput of an entire system. Hereinafter, each exemplary embodiment of the present invention will be described in detail.

1. First Exemplary Embodiment

A first exemplary embodiment of the present invention will be described by using a network illustrated in FIG. 2. Here, it is assumed that a logical path on which virtual network functions VNF1 to VNF3 are provided is formed by changing the setting of a packer header in an overlay network (upper layer network), and in response thereto, a path in an underlay network (lower layer network) as illustrated in FIG. 2 is formed.

1.1) System

Figure 1:
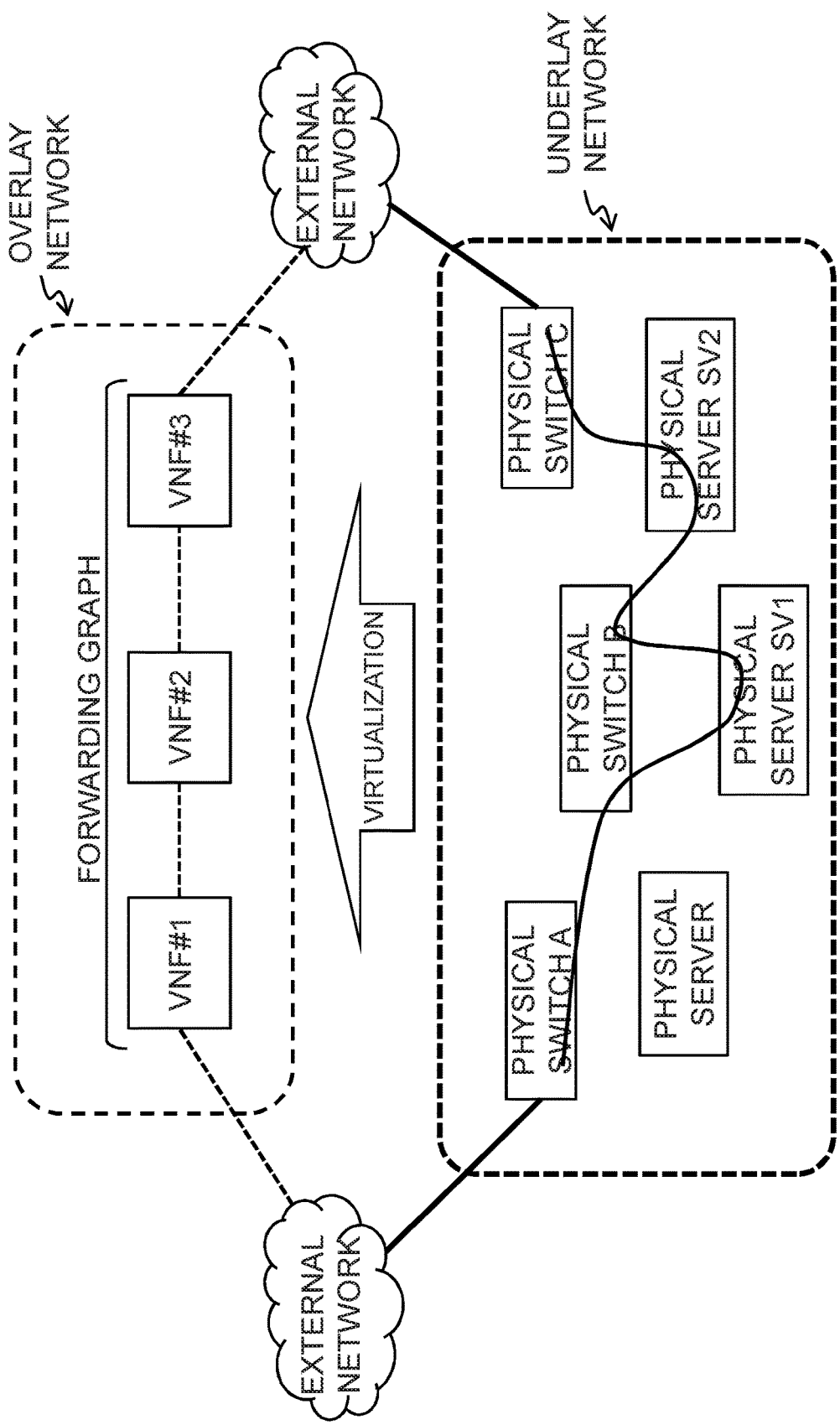
FIG. 1 is a schematic network diagram showing an example of Network Function Virtualization.
Figure 2:
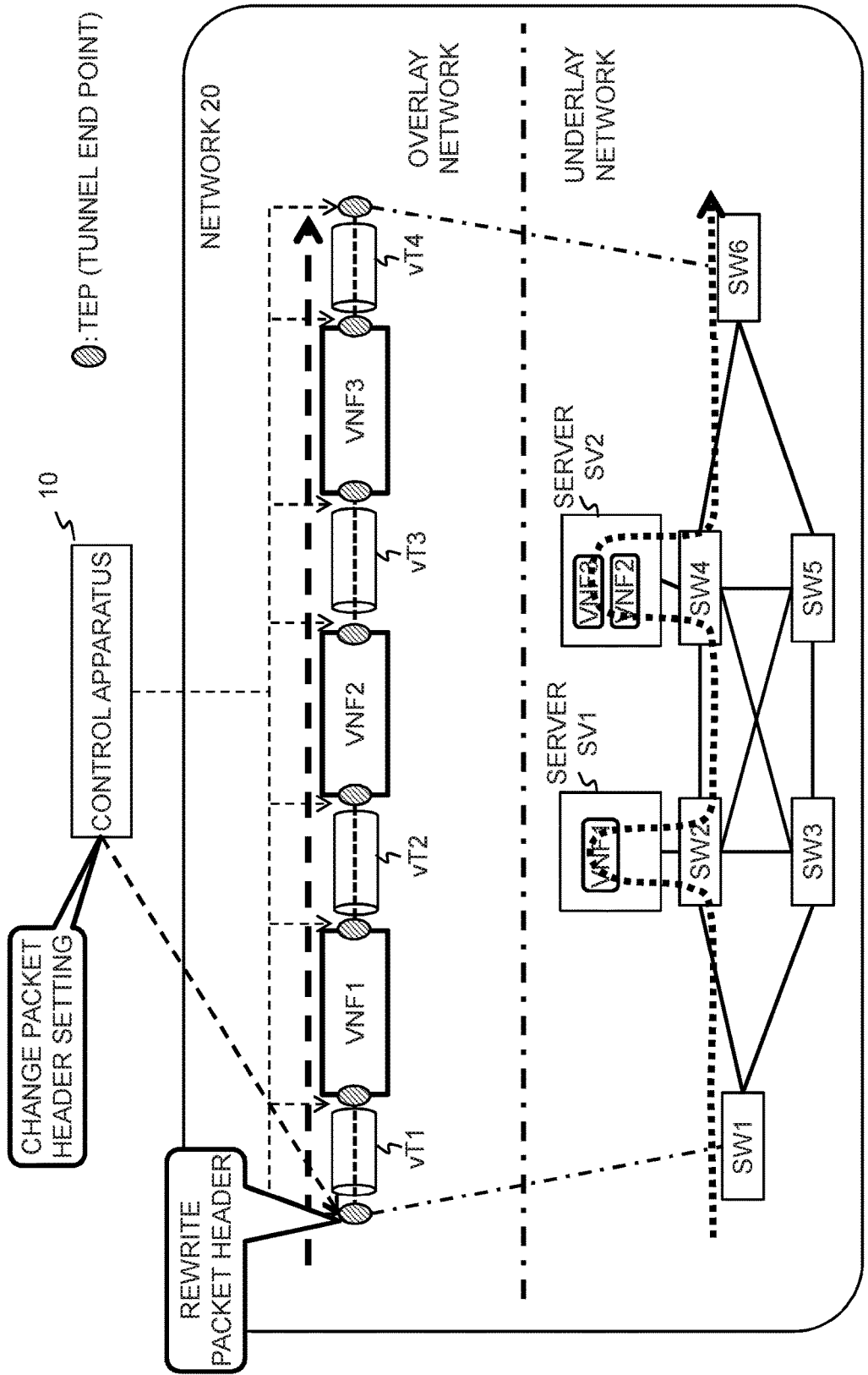
FIG. 2 is a schematic network diagram for describing rough operation in a network system according to a first exemplary embodiment of the present invention.

Referring to FIG. 2, a network system according to the first exemplary embodiment of the present invention includes a control apparatus 10 and a network 20, and the control apparatus 10 controls a node or a server having a function of setting up a virtual tunnel in the network 20. In the network 20, it is assumed as an example that the virtual network function VNF1 is deployed on a physical server SV1, and the virtual network functions VNF2 and VNF3 are deployed on a physical server SV2, to provide a network service. According to the present exemplary embodiment, the control apparatus 10 can change the setting of a packet header at a TEP (Tunnel End Point) of each virtual tunnel vT.

Figure 3:
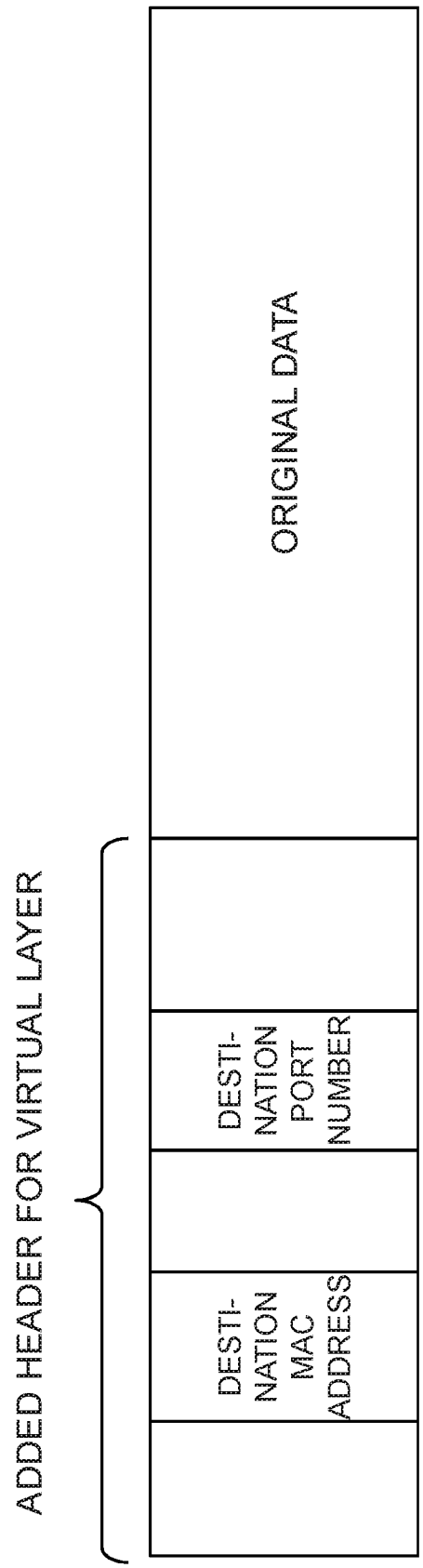
FIG. 3 is a format diagram showing an example of a packet header used in the network system according to the first exemplary embodiment.

Referring to FIG. 3, a change in the setting of a packet header by the control apparatus 10 is made to a header added for logical path (encapsulation). In case of changing the setting at a TEP, the setting of destination UDP port number, destination IP address, destination MAC address, tunnel identifier, or the like is changed. For example, in case of VXLAN (Virtual eXtensible LAN), the destination UDP port number and tunnel ID are changed, whereby it is possible to change a node N1's next hop destination based on the hash value of the packet header. Note that it is advantageous to change the setting at a TEP because a TEP is an endpoint of a virtual tunnel, but not only at a TEP, it is also possible to make a similar change to a network service by rewriting the MPLS (Multi Protocol Label Switching) label.

<Control Apparatus>

Figure 4:
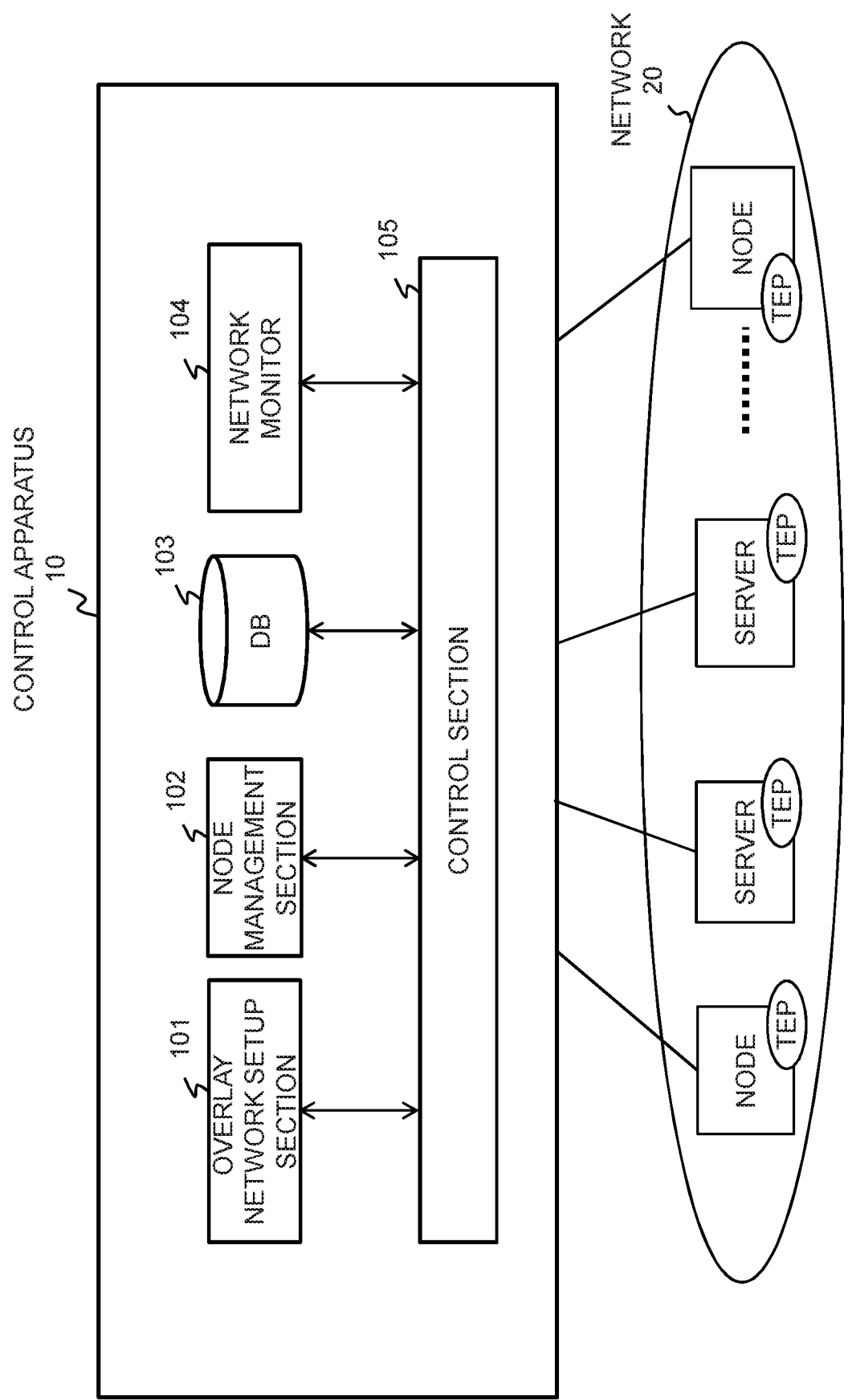
FIG. 4 is a block diagram showing the schematic configuration of a control apparatus according to the first exemplary embodiment.

As illustrated in FIG. 4, the control apparatus 10 according to the present exemplary embodiment controls nodes and servers that have the above-described TEP function and the like in the network 20, and includes an overlay network setup section 101, a node management section 102, a database 103, a network monitor 104, a control section 105, and a storage device (not shown).

The overlay network setup section 101 refers to the database 103 to set up a logical path that connects virtual nodes necessary for configuring a specific network service. The node management section 102 manages each virtual node involved in a network service. The database 103 stores network topology information relating to logical components and parameter information such as the state of use and required conditions of each logical component. The network monitor 104 monitors the load status and the like of the network 20.

The control section 105 configures the database 103 based on monitoring information acquired by the network monitor 104, and also controls operations including the changing of the setting of a virtual layer header (encapsulation) added to a packet, by using the above-described overlay network setup section 101, node management section 102, and database 103.

Note that functions equivalent to the overlay network setup section 101, node management section 102, network monitor 104, and control section 105 can also be implemented by executing programs stored in a memory (not shown) on a CPU (Central Processing Unit) or a computer.

<Node>

Figure 5:
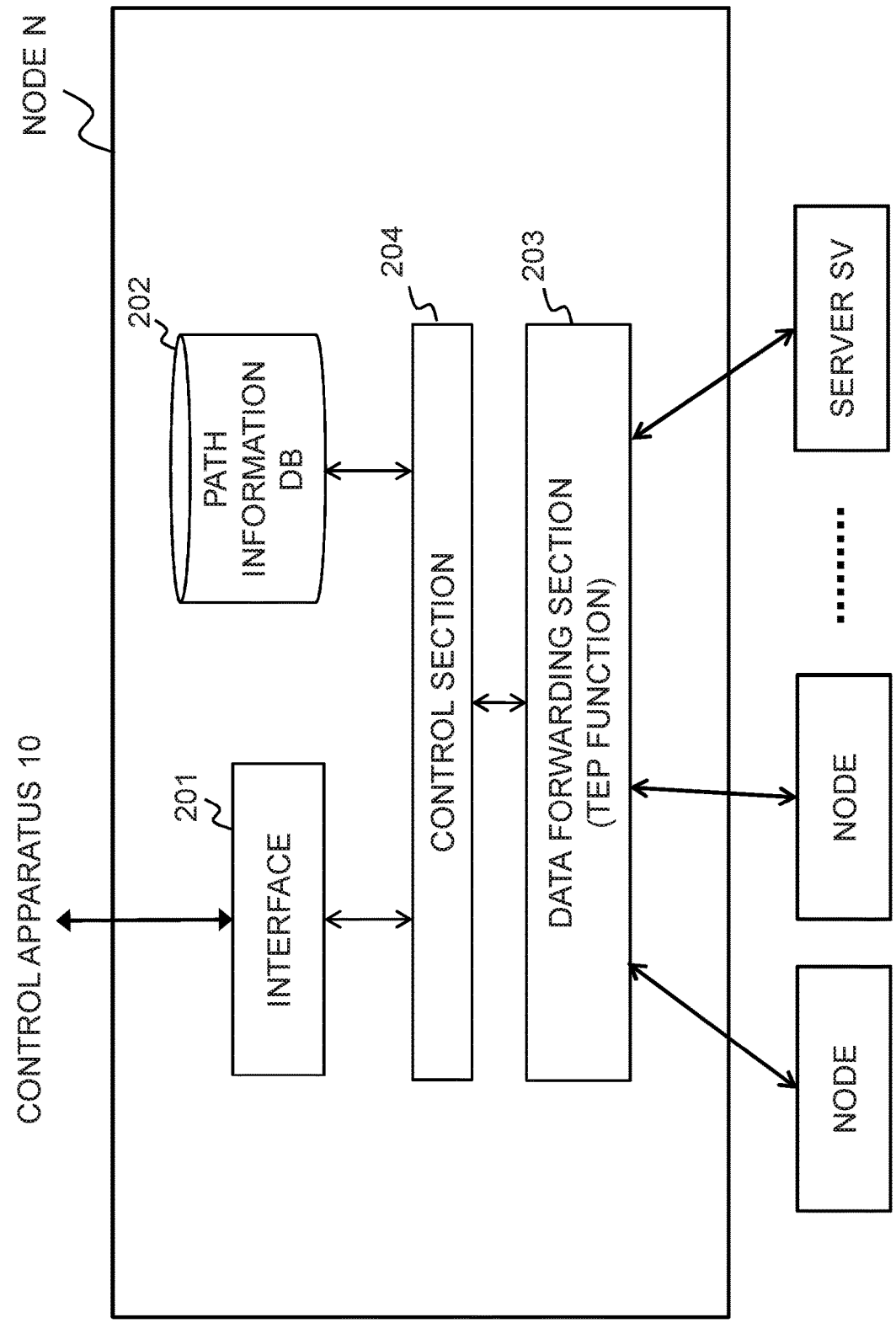
FIG. 5 is a block diagram showing the schematic configuration of a node in the first exemplary embodiment.

As illustrated in FIG. 5, a node N is a node having the above-described TEP function and the like and includes an interface 201 for performing communication with the control apparatus 10, a path information database 202, a data forwarding section 203, and a control section 204. The node N receives, from the control apparatus 10, data that includes a condition for identifying a flow belonging to a network service and the forwarding destination of a packet of this flow, and stores the data in the path information database 202. The data forwarding section 203 identifies a packet of the flow belonging to the network service based on the condition and the forwarding destination information stored in the path information database 202 and forwards the packet to the corresponding forwarding destination (node or server). At that time, the packet forwarding destination in the overlay network is changed by changing the setting of a packet header for logical path as described above, whereby it is possible to change a path in the underlay network.

<Server>

Figure 6:
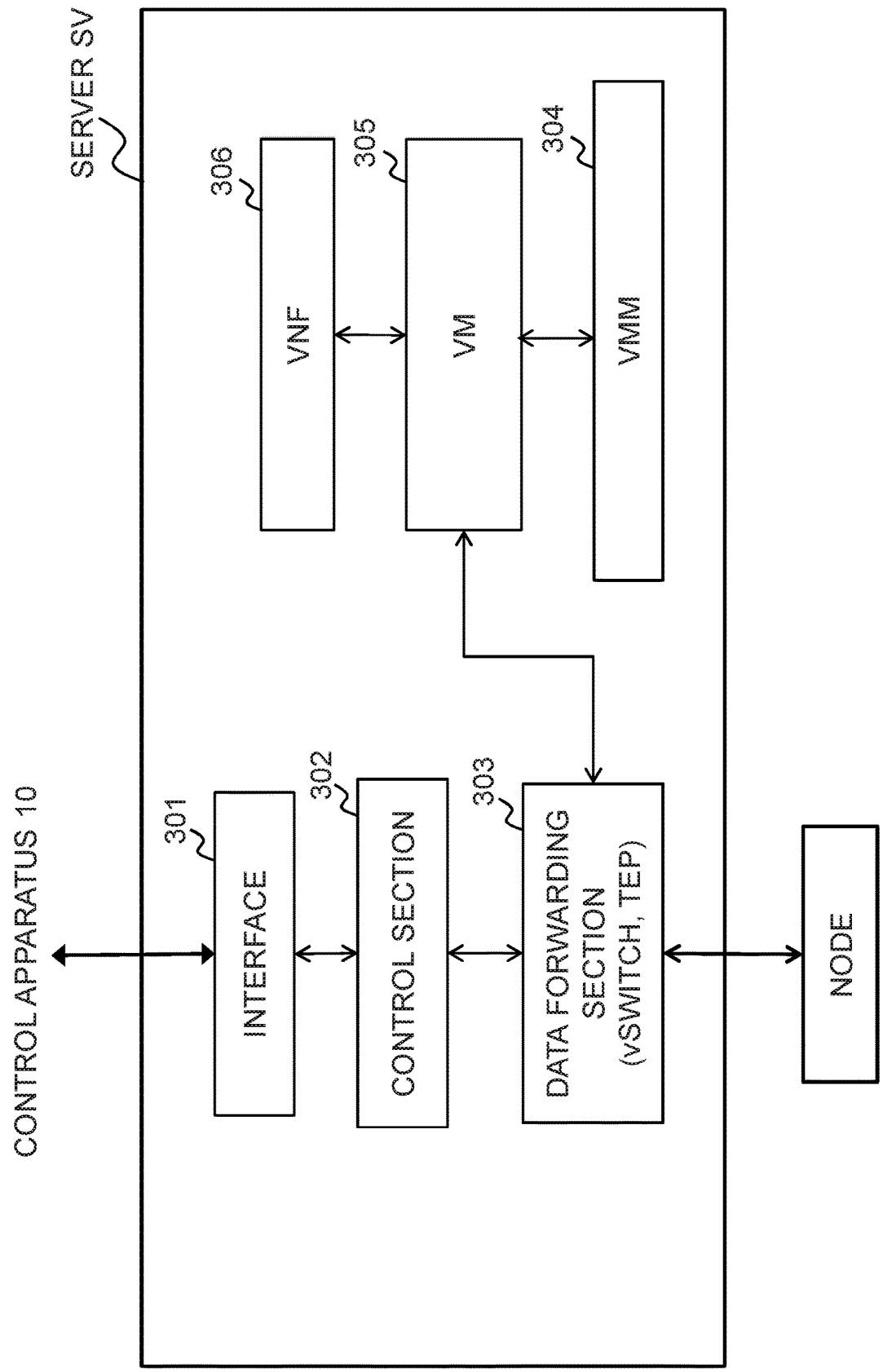
FIG. 6 is a block diagram showing the schematic configuration of a server in the first exemplary embodiment.

As illustrated in FIG. 6, a server SV includes an interface 301 for performing communication with the control apparatus 10, a control section 302, a data forwarding section 303 connected to a node, a virtual machine monitor (VMM) 304, a virtual machine (VM) 305, and a virtual network function (VNF) 306. The data forwarding section 303 has a virtual switch (vSwitch) function, a TEP function and the like, and the TEP function for encapsulation and the like is controlled as described above by the control apparatus 10 via the interface 301. Moreover, the VMM 304 controls the VM 305, and the VNF 306 is executed on the VM 305. Communication of the VM 305 is performed via the data forwarding section 303.

1.2) Operation

The control apparatus 10, when detecting from network monitoring information that a current network service cannot maintain a required service level, then changes the setting of a header added for logical path (encapsulation), such as the destination UDP port number, destination IP address, destination MAC address, tunnel identifier, or the like. Thus, a logical path including the virtual network functions NVF1 to VNF3 is formed via tunnels vT in the overlay network, as illustrated in FIG. 2.

For example, when the control apparatus 10 changes the setting of the packet header in the overlay network and the packet header is rewritten at a TEP, then in the underlay network, one of a plurality of possible physical paths is selected. At that time, the path selection in the underlay network cannot be managed from the overlay network side. In the underlay network illustrated in FIG. 2, a physical path from a switch SW1 to SW 6 via the servers SV1 and SV2 is selected.

1.3) Effects

As described above, according to the first exemplary embodiment of the present invention, a logical resource in the overlay network is changed, whereby a physical resource in the underlay network can be changed, and it is thus possible to easily achieve assurance of the quality of a network service and optimization of the throughput of an entire system.

<Example>

Figure 7:
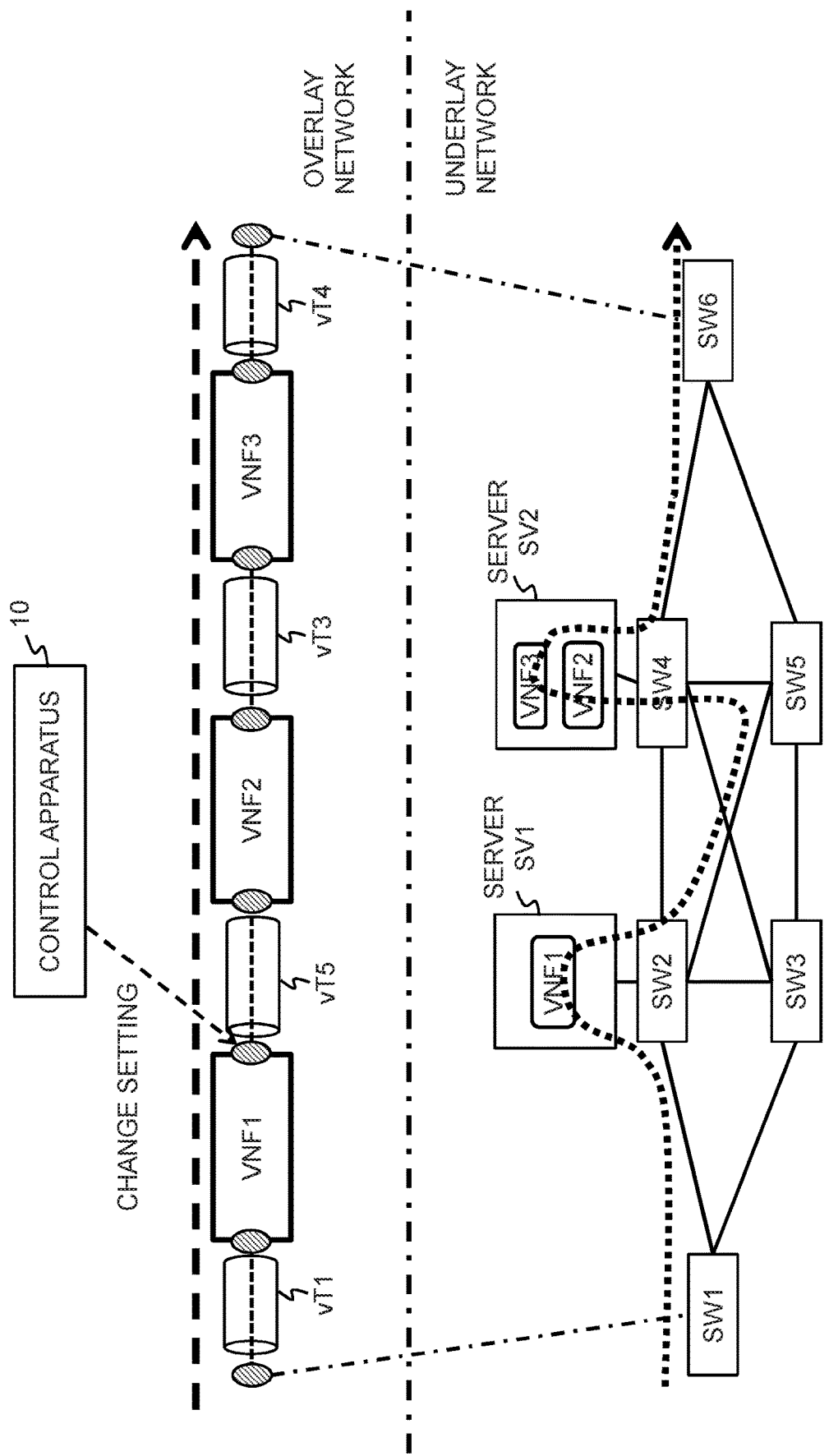
FIG. 7 is a schematic network diagram showing an example of operation in the network system shown in FIG. 2.

As described above, according to the present exemplary embodiment, TEP setting is changed, whereby it is possible to indirectly change the forwarding destination of a packet in the underlay network, which cannot be directly managed from the overlay network. Hereinafter, a description will be given of an exemplary operation in an example of the present invention shown in FIG. 7, with reference to the drawing.

According to the exemplary operation in this example, virtual network functions VNF1 to VNF3 for a network service in the overlay network are provided by physical servers SV1 and SV2 as in FIG. 2, and only a path in the underlay network to which the network service is mapped is switched.

The control apparatus 10 changes TEP setting, whereby it is possible to provide the same network service VNF1-VNF3, which, in the underlay network, passes along a new path via a physical switch SW5 and is implemented by the same physical servers SV1 and SV2 as the original network service.

A conceivable trigger for the control apparatus 10 to change TEP setting is a case where the network service has become unable to fulfill an original required service level. In this case, a physical path mapped to this network service is changed by changing TEP setting as described above, and it is checked whether or not the performance is improved, and if not improved, it is only necessary to further change TEP setting.

2. Second Exemplary Embodiment

According to a second exemplary embodiment of the present invention, part of a logical configuration in the logical layer can be changed.

Figure 8:
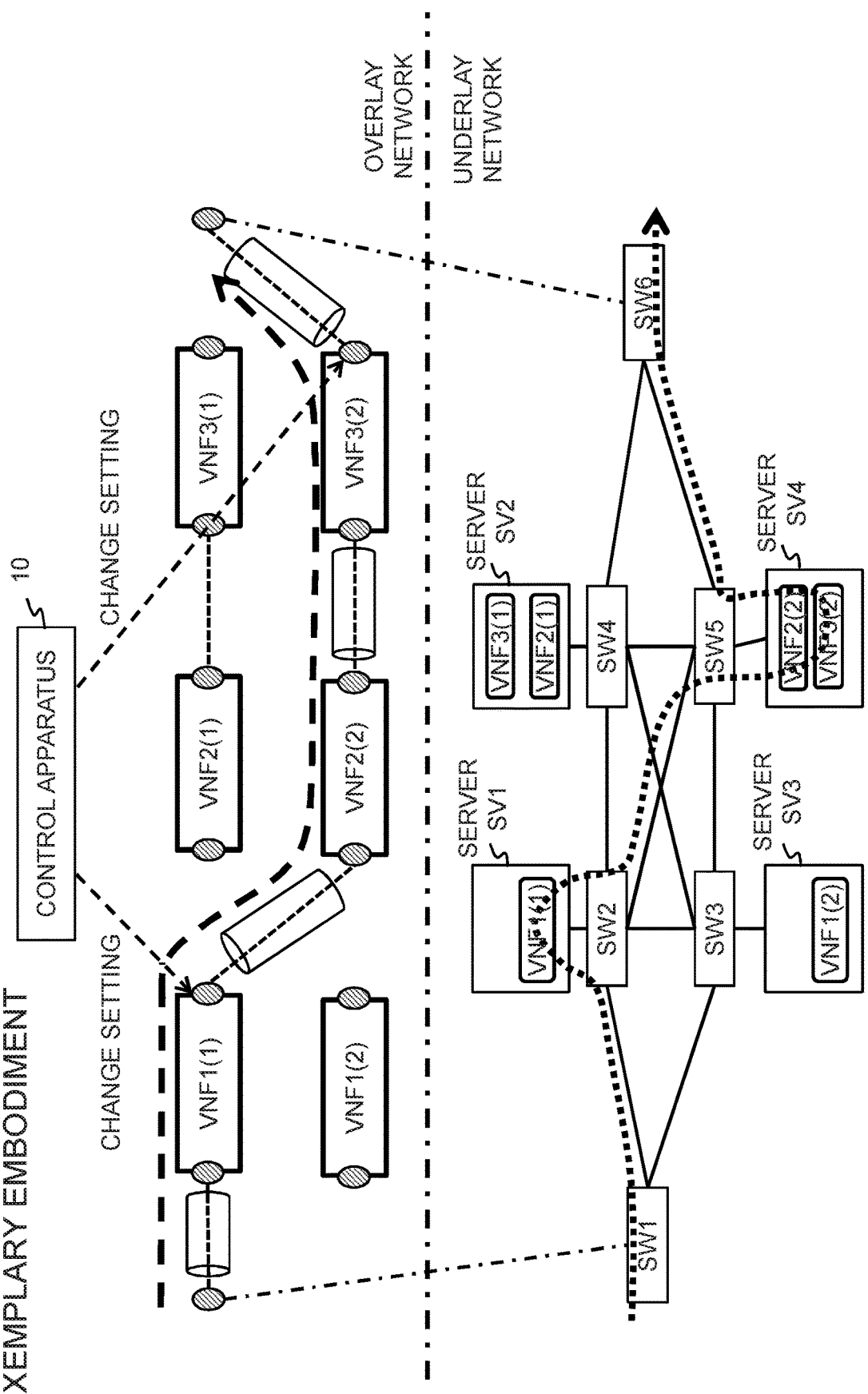
FIG. 8 is a schematic network diagram showing an example of operation in a network system according to a second exemplary embodiment of the present invention.

Referring to FIG. 8, it is assumed that the overlay network has a redundant structure in which virtual network functions VNF1(2) to VNF3(2) are deployed, which are the same as virtual network functions VNF1(1) to VNF3(1) corresponding to the network service shown in FIG. 2. Moreover, the underlay network has a redundant structure in which, to correspond to each virtual network function in the overlay, the virtual network function VNF1(1) is deployed on a physical server SV1 and the virtual network functions VNF2(1) and VNF3(1) are deployed on a physical server SV2, and the virtual network function VNF1(2) is deployed on a physical server SV3 and the virtual network functions VNF2(2) and VNF3(2) are deployed on a physical server SV4.

According to the present exemplary embodiment, part of the logical resources used by the network service in the overlay network is changed, whereby a resource or resources in the underlay network are indirectly changed correspondingly.

As illustrated in FIG. 8, a control apparatus 10 changes TEP setting on a virtual layer of the physical server SV1 and TEP setting on a virtual layer of the physical server SV4, whereby the logical resources used by the network service are changed from the virtual network functions VNF2(1) and VNF3(1) to the virtual network function VNF2(2) and VNF3(2). With this change, the path in the underlay network is switched to a path via the physical switch SW5, providing the network service which includes the virtual network function VNF1(1) on the physical server SV1 and the virtual network functions VNF2(2) and VNF3(2) on the physical server SV4.

A conceivable trigger for the control apparatus 10 to change TEP setting is a case where, for example, the server SV2 suffers a failure or falls in an overloaded state and the network service has become unable to fulfill an original required service level. In this case, TEP setting is changed as described above, whereby in the underlay network, switching is made from the server SV2 where the problem has occurred to the server SV4 where the same virtual network functions are deployed. The performance of the network service following this new path is checked, and if no improvement is made, it is only necessary to further change TEP setting.

3. Third Exemplary Embodiment

According to a third exemplary embodiment of the present invention, an entire logical configuration in the overlay network can be changed. Hereinafter, the third exemplary embodiment of the present invention will be described in detail by taking a system shown in FIG. 9 as an example, with reference to the drawing.

Figure 9:
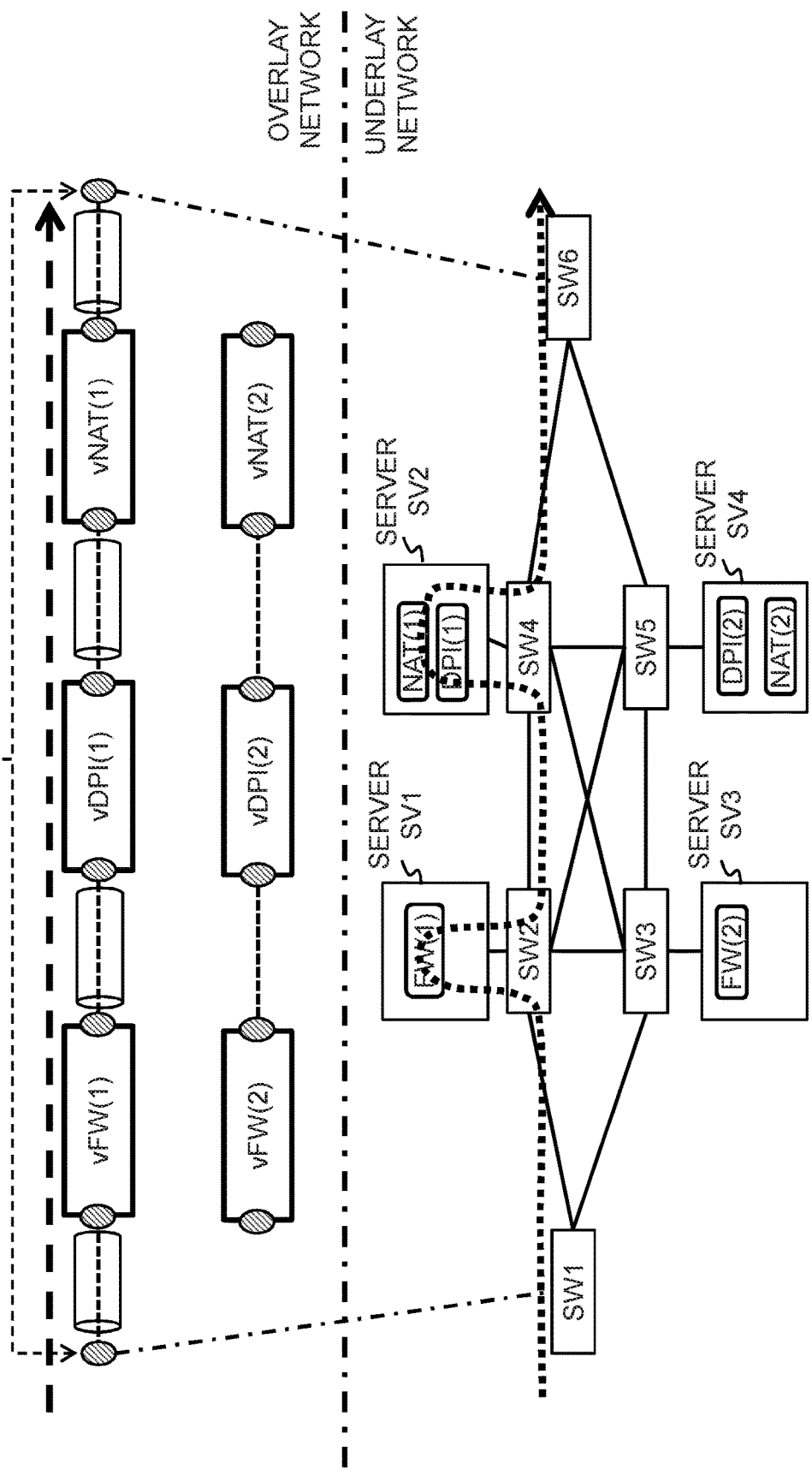
FIG. 9 is a schematic network diagram showing an example of a network system according to a third exemplary embodiment of the present invention.

Referring to FIG. 9, it is assumed that FW(1) is deployed on a physical server SV1, and DPI(1) and NAT(1) are deployed on a physical server SV2, thus configuring a first logical path involved in a network service. Moreover, it is assumed that FW(2) is deployed on a physical server SV3, and DPI(2) and NAT(2) are deployed on a physical server SV4, thus configuring a second logical path. The first and second logical paths are redundantly configured paths for providing the same virtual network functions, and all or part of traffic is switched to any one of the logical paths at a load balancer LB or at a TEP provided to a physical switch SW1.

Figure 10:
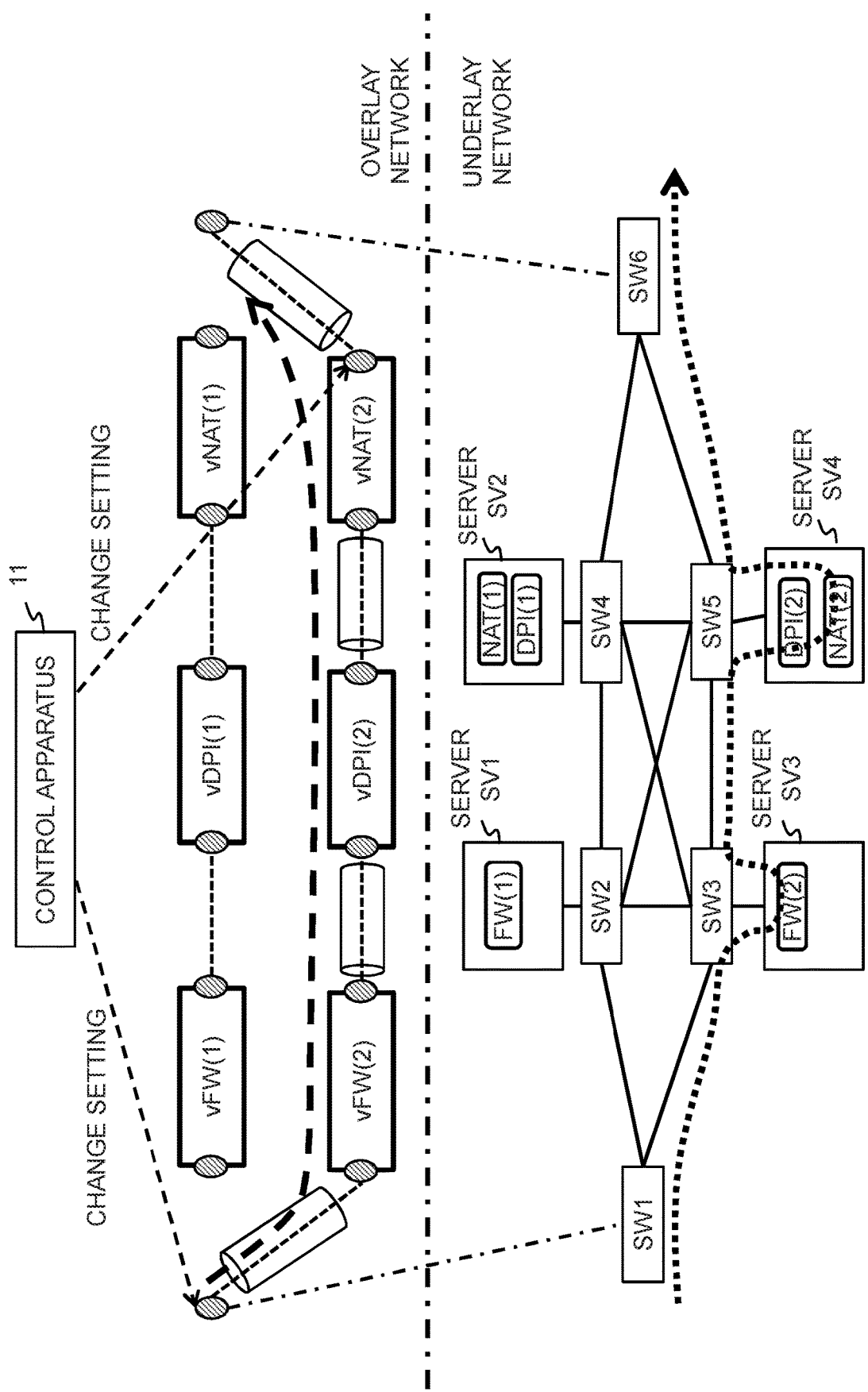
FIG. 10 is a schematic network diagram showing an example of operation in the network system according to the third exemplary embodiment.

As illustrated in FIG. 10, a control apparatus 11, for example, when determining that a network service does not fulfill a required service level, then changes TEP setting and switches the logical resources used by the network service from the first logical path passing through FW(1), DPI(1) and NAT(1) to the second logical path passing through FW(2), DPI(2) and NAT(2). With such changing, the physical switch SW1 in the underlay network switches the network service from a first path using the physical servers SV1 and SV2 to a second path using the physical servers SV3 and SV4.

In this manner, redundant paths are prepared for a network service in the overlay network, and a logical path in the overlay network is changed, whereby a physical path in the underlay network is indirectly changed, and it is thus possible to maintain the required service level of the network service.

4. Fourth Exemplary Embodiment

According to a fourth exemplary embodiment of the present invention, when the occurrence of a failure, an overloaded state or the like is detected based on network monitoring information, the setting of a virtual tunnel is changed at an endpoint of a network service to switch to a logical path providing the network service composed of the same virtual network functions. For example, the setting of a tunnel is changed at a TEP that is an endpoint of a network service, whereby logical resources used in the overlay network are changed at once. As described already, with a change to the logical resources in the overlay network, resources in the underlay network can be indirectly changed. Moreover, a change of the setting of a virtual tunnel is triggered when a network service has become unable to fulfill a required service level as described above, or when the occurrence of a failure, an overloaded state or the like is detected in the network 20, or the like. Note that switching of a logical path in the overlay network may be performed on part of the logical configuration as in the above-described second exemplary embodiment, or may be performed on the entire logical configuration as in the third exemplary embodiment. Hereinafter, the present exemplary embodiment will be described by depicting only the overlay network in a drawing.

4.1) System Architecture

Figure 11:
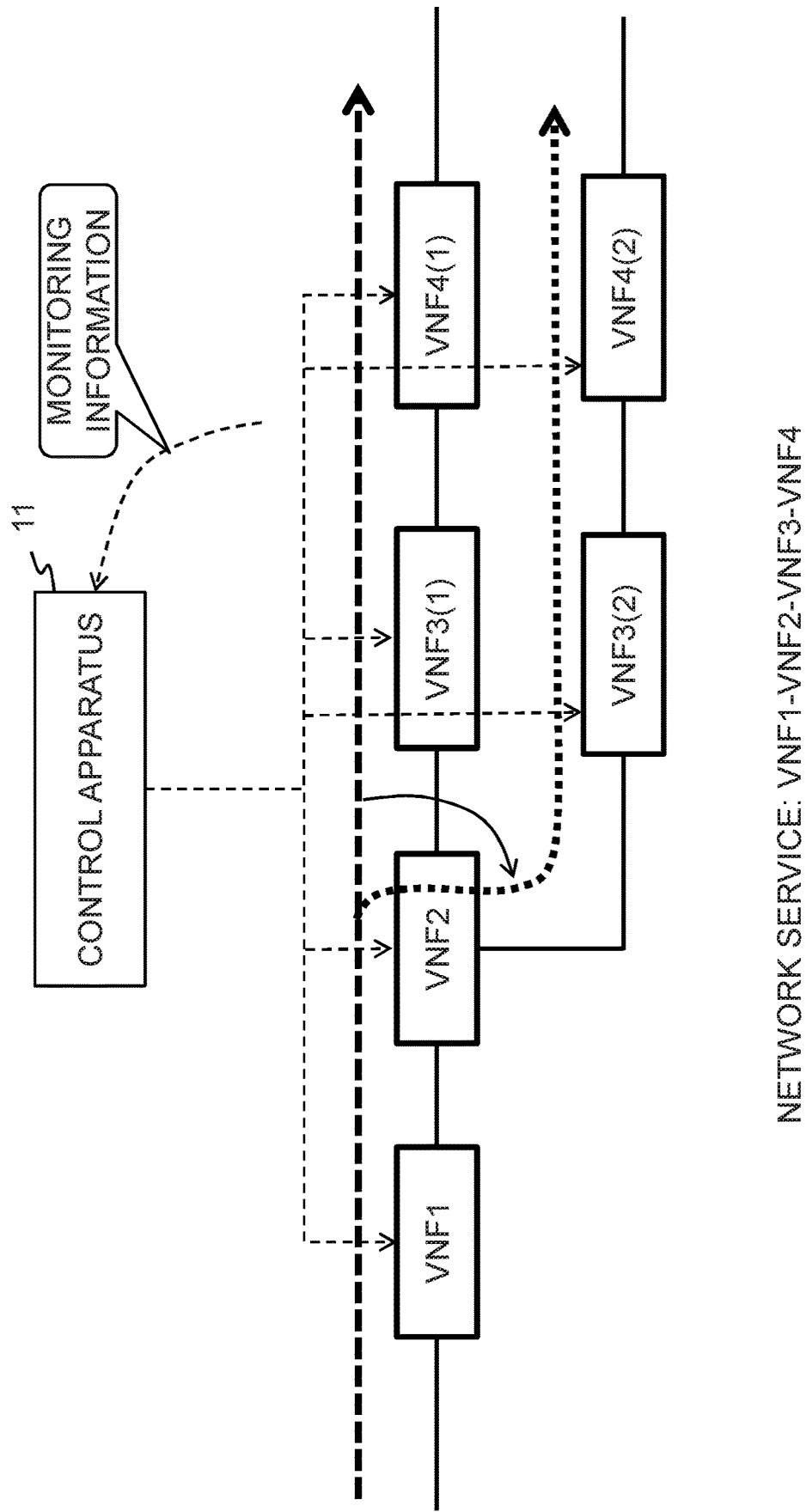
FIG. 11 is a schematic network diagram showing an example of the configuration of a virtual layer in a network system according to a fourth exemplary embodiment of the present invention.

In the overlay network illustrated in FIG. 11, a network service composed of virtual network functions VNF1 to VNF4 is depicted, wherein it is assumed that the virtual network functions VNF3 and VNF4 can be set as redundant paths having the same functions. A control apparatus 11 basically has a configuration similar to the control apparatus 10 shown in FIG. 4, but the overlay network setup section 101 also sets a plurality of redundant paths having the same virtual network functions, in addition to setting a logical path according to the first exemplary embodiment. The network monitor 104 monitors network status (a failure, an overloaded state or the like), and the control section 105 indirectly controls lower-layer resources by switching the logical path of a network service, that is, controlling logical resources in the overlay network, depending on the load status.

It is assumed that the network service such as, for example, SLA (Service Level Agreement) has become unable to fulfill a required service level when some traffic is being forwarded via the virtual network functions VNF1, VNF2, VNF3(1) and VNF4(1). In this case, the control apparatus 11 rewrites a packet header for the network service so that the logical path is switched at an endpoint of this network service, whereby the logical path of the traffic is switched to the side of the virtual network functions VNF3(2) and VNF4(2). The logical resources are changed in this manner, whereby resources in the underlay network can be indirectly changed as described already.

Changing the logical path of a network service can be performed by rewriting a packet header (VXLAN header or the like) at a TEP as described above. Although the point where the setting of a header is changed does not need to be a TEP, it is preferable to change the setting particularly at a TEP that is an endpoint of a network service. Since a TEP exists at the ingress/egress of each VNF, it is possible to change the setting at each TEP.

4.2) Operation

Figure 12:
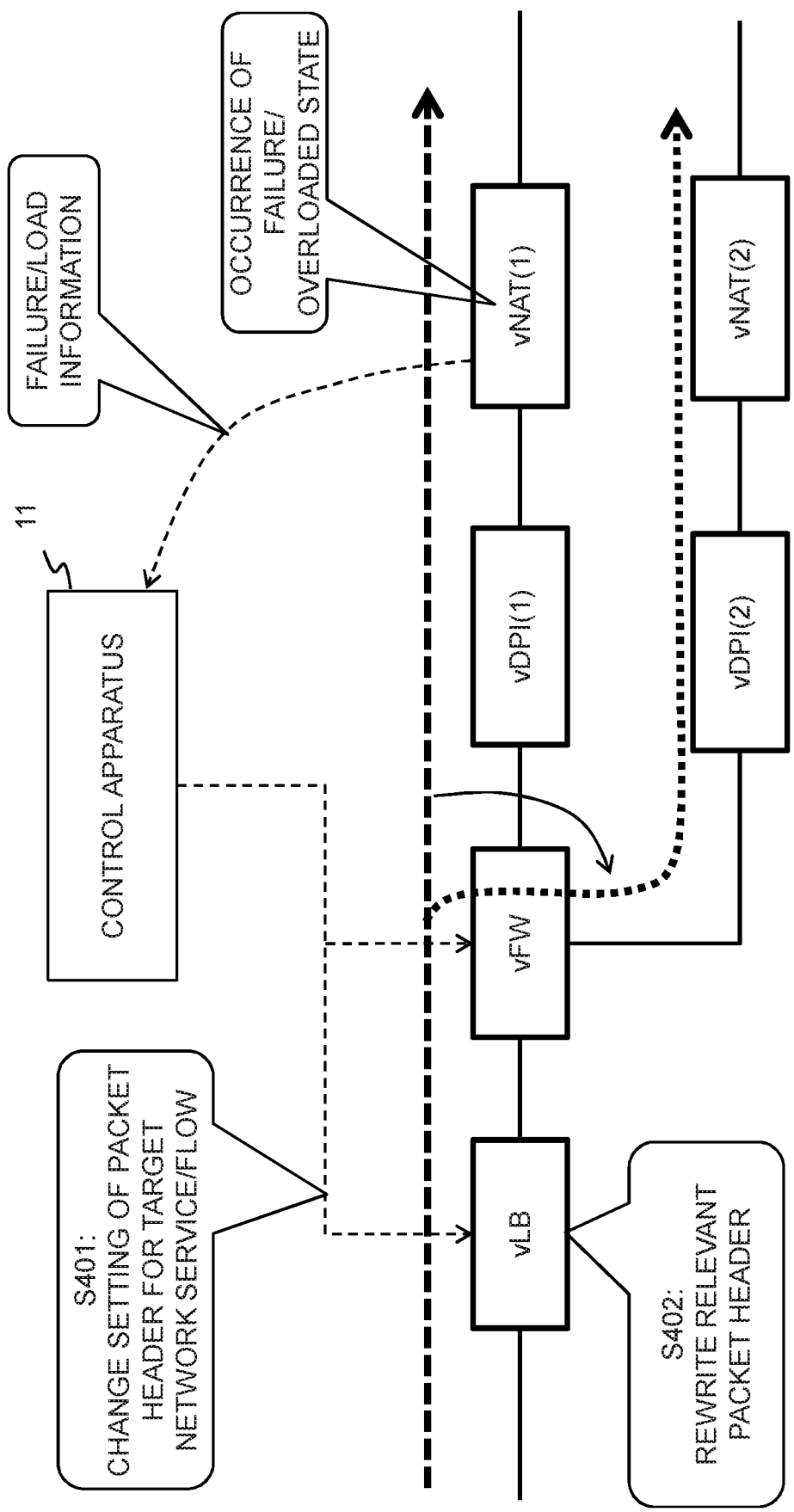
FIG. 12 is a schematic network diagram showing an example of operation in the network system according to the fourth exemplary embodiment.

Referring to FIG. 12, it is assumed as an example that the virtual network functions VNF1, VNF2, VNF3 and VNF4 are a virtual load balancer (vLB), a virtual firewall (vFW), a virtual deep packet inspection (vDPI) and a virtual NAT (vNAT), respectively, and that vDPI and vNAT can be set on different logical paths. The load balancer vLB can switch part or all of traffic to the logical path of vDPI(1) and vNAT(1) or the logical path of vDPI(2) and vNAT(2) in accordance with the control of the control apparatus 11.

The control apparatus 11, for example, when determining that the network service does not fulfill a required service level due to the occurrence of a failure or an overloaded state, then instructs the vLB to change the setting of a packet header for the target network service or flow (Operation S401). The vLB rewrites the relevant packet header in accordance with the instruction from the control apparatus 11 (Operation S402), whereby all or part of the traffic is switched to either the logical path of vDPI(1) and vNAT(1) or the logical path of vDPI(2) and vNAT(2). With such a change to the logical resources, resources in the underlay network can be indirectly changed so that the required service level will be fulfilled.

Note that it is also possible that the control apparatus 11 predetermines a plurality of logical path candidates for a network service passing through virtual network functions required by some traffic, and performs control in such a manner to select a higher-performance logical path among these candidates. For a selection method, any of methods listed below as examples can be employed.

- A network service exhibiting higher performance is selected in a searching manner by appropriately switching between the plurality of logical path candidates. Since there are approximately 10 to 15 logical paths at the most for a network service, it is possible to employ the method of finding an optimum solution in such a searching manner.
- A higher-performance network service is selected in consideration of the performance of each resource in each logical path candidate. For example, the performances of resources such as a physical server, a physical switch, and a virtual machine are calculated, and a network service exhibiting higher performance is selected.
- A logical path candidate with the smallest amount of traffic at that moment is selected.

Since different logical path candidates have different logical resources, the different logical path candidates also have different resources in the underlay network, as described above. Accordingly, performance differs with the logical path candidates, and therefore performance ranks can be estimated beforehand.

The control apparatus 11 selects a higher-performance logical path candidate and assigns it to the traffic. That is, as in the above-described operation, the control apparatus 11 instructs the vLB to change the setting of a packet header (Operation S401), and the vLB rewrites the relevant packet header in according with this instruction to change the setting (Operation S402). Thus, the network service can be provided by using the higher-performance logical path.

5. Fifth Exemplary Embodiment

According to a fifth exemplary embodiment of the present invention, when the occurrence of a problem at a node is detected, an edge-node load balancer is caused to change the setting of a packet header for the logical path of a relevant network service in order to solve this problem. Note that switching of a logical path in the overlay network may be performed on part of the logical configuration as in the above-described second exemplary embodiment, or may be performed on the entire logical configuration as in the third exemplary embodiment.

Figure 13:
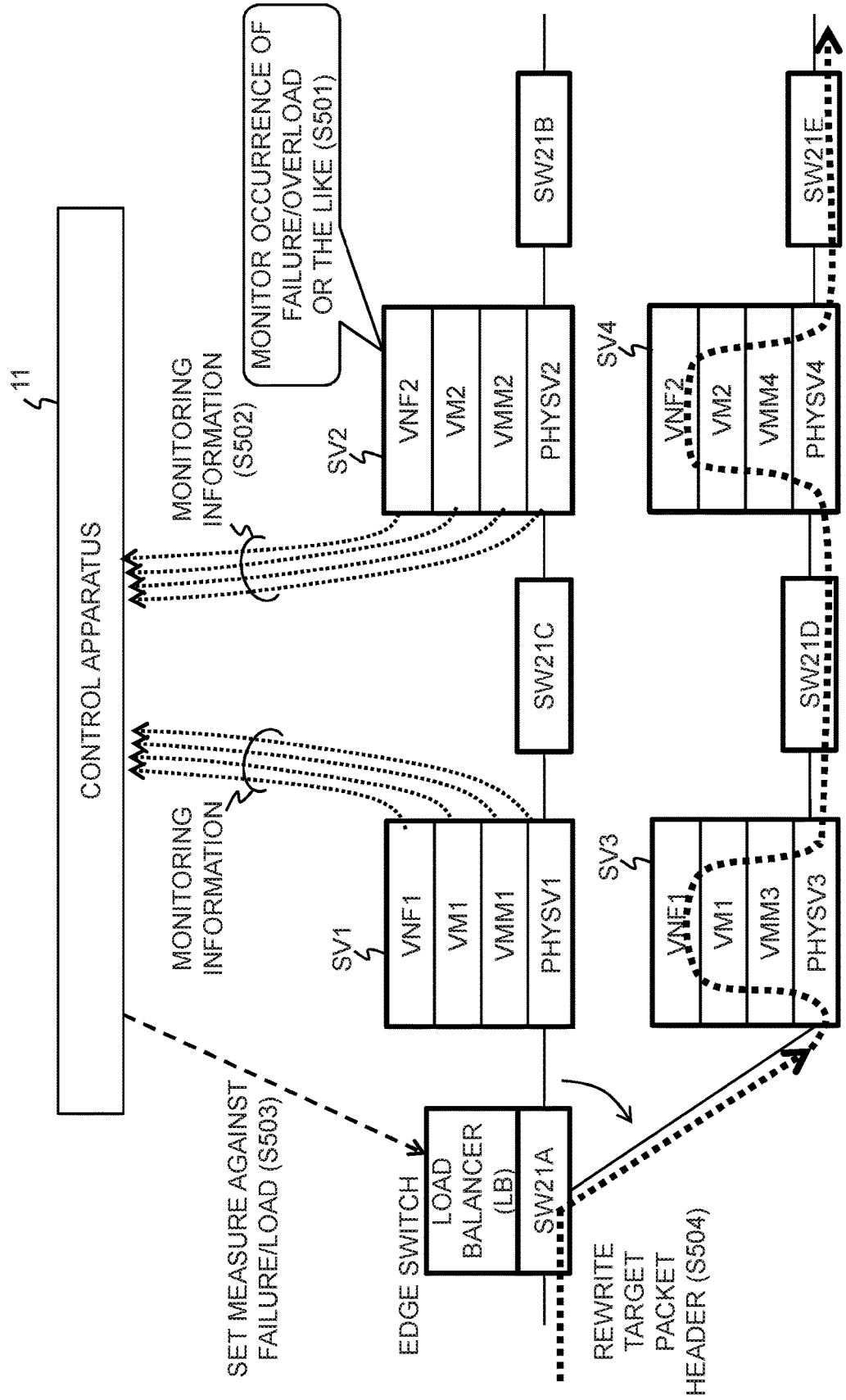
FIG. 13 is a schematic network diagram showing an example of a network system according to a fifth exemplary embodiment of the present invention.

Referring to FIG. 13, a network system according to the fifth exemplary embodiment of the present invention includes a control apparatus 11 and a network controlled by the control apparatus 11. It is assumed that the network includes physical switches 21A, 21B, 21C, 21D and 21E, a server SV1 deployed between the physical switches 21A and 21C, a server SV2 deployed between the physical switches 21C and 21B, a server SV3 deployed between the physical switches 21A and 21D, and a server SV4 deployed between the physical switches 21D and 21E. Here, it is assumed that the physical switch 21A is an edge switch of a network configuring a network service, and that the physical switch 21A is physically or virtually provided with a load balancer LB.

Each of the servers SV1 to SV4 has a multi-layer structure composed of a virtual network function (VNF) layer, a VM layer on which VNFs are activated, a VM management layer for performing VM creation and management, and a physical layer on which the VM management function is implemented, and it is assumed here that each of VNF1 to VNFm configuring the network service can be deployed on the servers SV1 to SVn. In case where each server has the multi-layer structure, for example, a network service including one or more types of VNFs can be regarded as an extended network service that, in actuality, passes not only through the VNFs on servers but also through the physical layer, VM layer, VM management layer and the like, which are lower layers. The control apparatus 11 acquires information from component resources on all layers including VNFs, based on such an extended network service.

The virtual network functions VNF1 and VNF2 in the present example can be treated as an extended network service by regarding each of the physical switch 21A, a physical link, the individual layer components of the server SV1 (PHYSV1/VMM1/VM1/VNF1), a physical link, the physical switch 21C, a physical link, and the individual layer components of the server SV2 (PHYSV2/VMM2/VM2/VNF2) as a node. Similarly, the virtual network functions VNF1 and VNF2 after logical path switching can be treated as an extended network service by regarding each of the physical switch 21A, a physical link, the individual layer components of the server SV3 (PHYSV3/VMM3/VM1/VNF1), a physical link, the physical switch 21D, a physical link, and the individual layer components of the server SV4 (PHYSV4/VMM4/VM2/VNF2) as a node.

The control apparatus 11 has a configuration and functions similar to those of the first exemplary embodiment shown in FIG. 4. That is, the control section 105 acquires monitoring information from each node in the network and stores it in the database 103 and, when the node management section 102 detects the occurrence of a problem at a node, causes the load balancer of the edge node to change the setting of a packet header for the logical path of a relevant network service in order to solve this problem.

Referring to FIG. 13, a case will be considered as an example in which the VNF1 and VNF2 for some traffic are processed on the servers SV1 and SV2, respectively, and a problem such as a failure or an overloaded state occurs at the VNF2 and its lower-layer nodes. The control apparatus 11 monitors the network and acquires monitoring information from each node in the network (Operations S501 and S502). When detecting the occurrence of a problem such as a failure or an overloaded state at the VNF2 and its lower layers on the server SV2, the control apparatus 11 instructs the load balancer LB of the edge switch 21A to change the setting of the header of a relevant packet so that all or part of the traffic to the VNF2 node is switched to a logical path via the servers SV3 and SV4 (Operation S503). Thus, at the edge switch 21A, switching of at least part of the logical path is performed for the present traffic (Operation S504), and the same network service is configured via the servers SV3 and SV4.

6. Sixth Exemplary Embodiment

According to a sixth exemplary embodiment of the present invention, when a problem such as a failure or an overloaded state at a some-layer node is detected based on an extended network service, an instruction is made to change the setting of a packet header for logical path. Note that switching of a logical path in the overlay network may be performed on part of the logical configuration as in the above-described second exemplary embodiment, or may be performed on the entire logical configuration as in the third exemplary embodiment.

Figure 14:
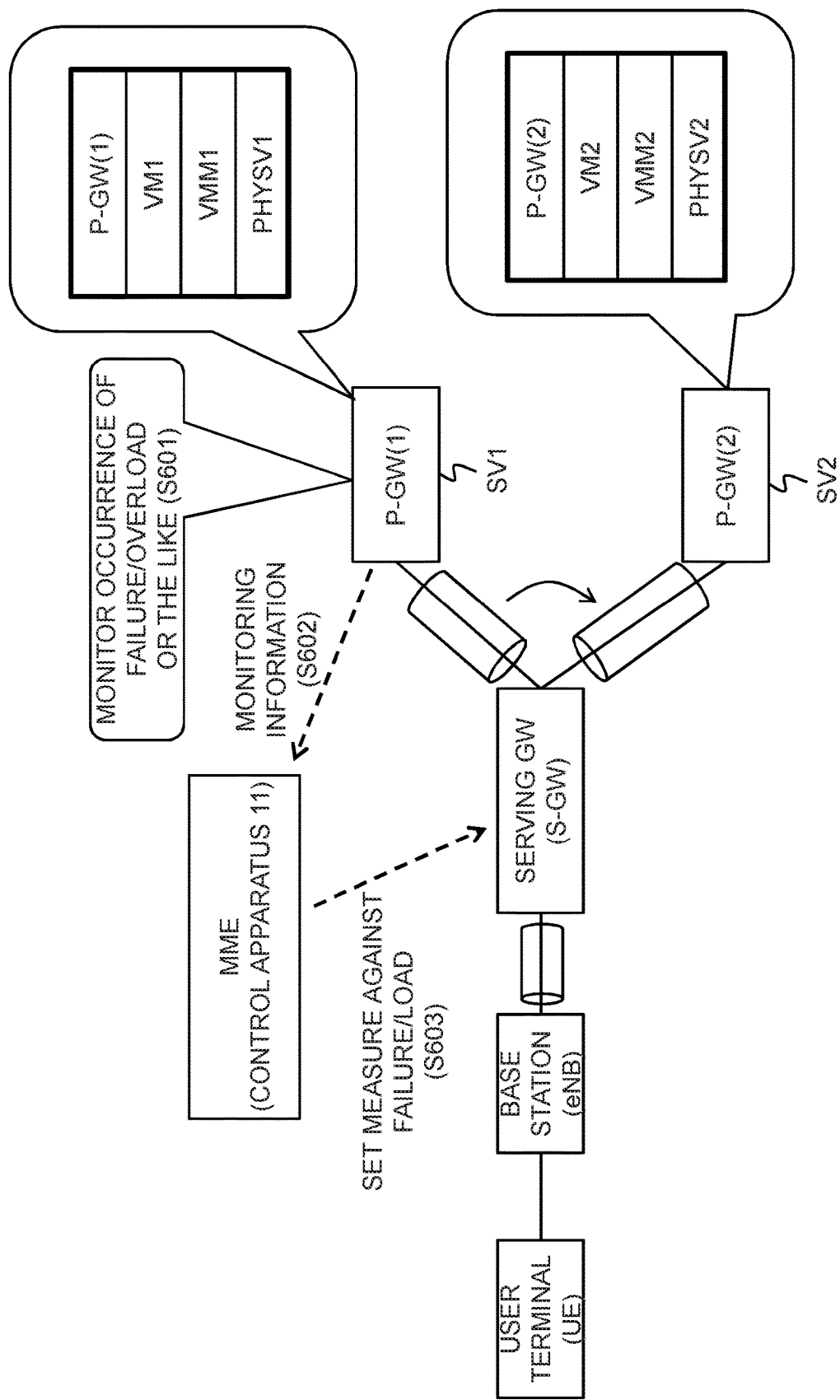
FIG. 14 is a schematic network diagram showing an example of a network system according to a sixth exemplary embodiment of the present invention.

As illustrated in FIG. 14, a network system according to the sixth exemplary embodiment of the present invention is applied to a 3GPP system, and here the above-described control apparatus 11 corresponds to MME (Mobile Management Entity), and the above-described VNF corresponds to P-GW (Packet Data Network Gateway). That is, as shown in the drawing, servers SV1 and SV2 generate P-GW functionality on the VNF layer, and a network service including this P-GW functionality is treated as an extended network service including the individual-layer nodes, P-GW/VM/VMM/PHYSV. Note that in the present exemplary embodiment, it is assumed that the servers SV1 and SV2 are each provided with a function of monitoring a failure/overloaded state and notifies failure/overloaded state detection information to the MME (control apparatus 11).

Referring to FIG. 14, a user terminal UE can wirelessly connect to a base station eNB and perform packet communication with an external network (Packet Data Network) through tunnels (GTP (GPRS Tunneling Protocol) tunnels) set up between the base station eNB and an S-GW (Serving Gateway) and between the S-GW and P-GW. As described already, the control apparatus 11, which is MME, collects monitoring information from the network system and stores it in the database 103 and, when detecting a problem such as a failure or an overloaded state at a some-layer node based on the extended network service, instructs the S-GW to change a tunnel. Hereinafter, a description will be given of a case where a problem such as a failure or an overloaded state occurs at the currently used P-GW (1) and the logical path of the traffic of the user terminal UE is changed.

Figure 15:
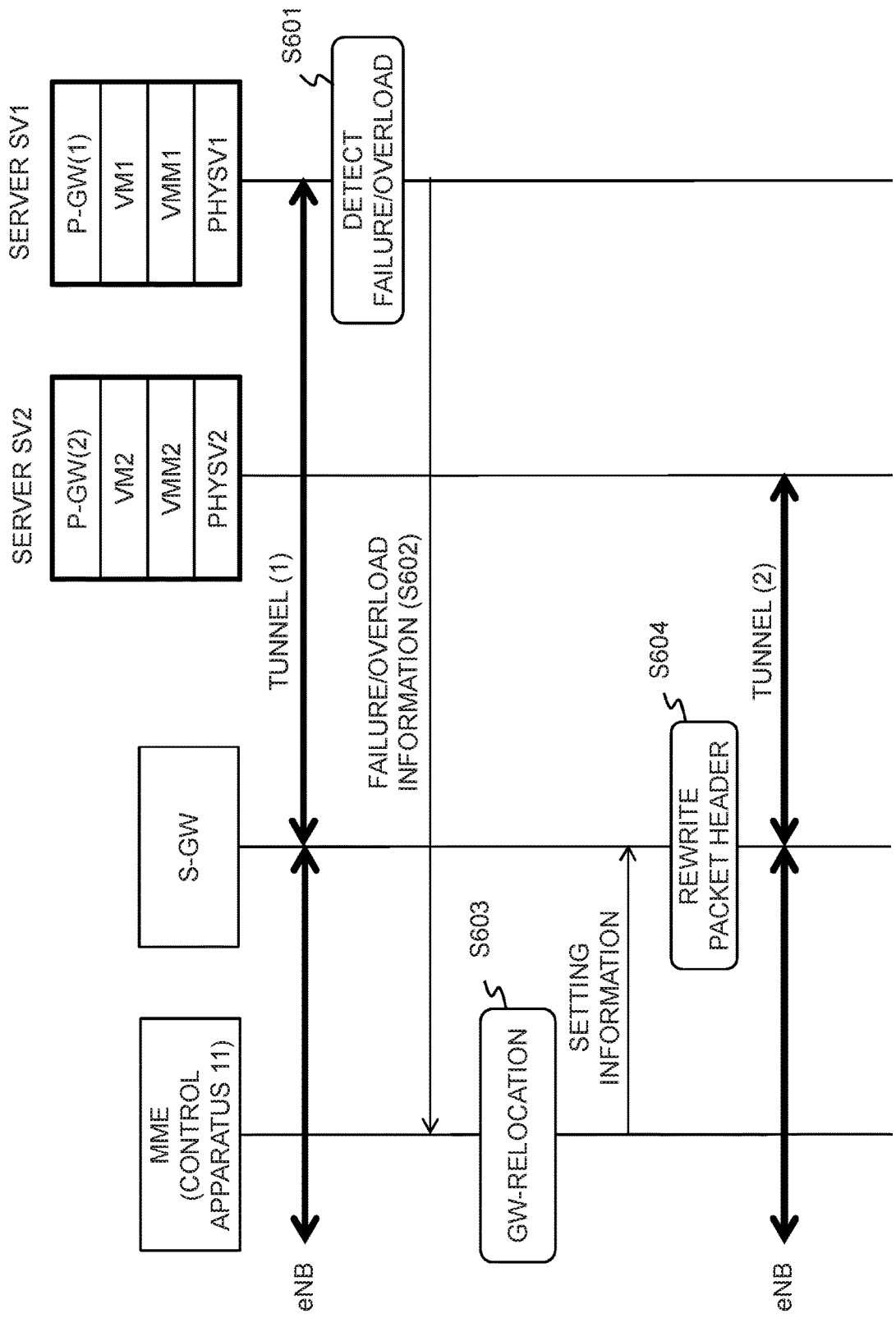
FIG. 15 is a sequence chart showing operation in the network system according to the sixth exemplary embodiment.

Referring to FIG. 15, in a state where a tunnel (1) is set up between the S-GW and P-GW (1) and the P-GW (1) is provided as a virtual network function VNF by the server SV1, it is assumed that a failure or an overloaded state is detected at the P-GW(1) and its lower-layer nodes (Operation S601) and failure/overload information is notified to the MME (Operation S602).

When receiving the failure/overload information from the server SV1, the MME refers to the database 103 and performs P-GW relocation (Operation S603). The MME notifies P-GW relocation setting information to the S-GW, causing the S-GW to rewrite a packet header for a relevant network service at a TEP, whereby the logical path is switched from the P-GW (1) on the server SV1 to the P-GW (2) on the server SV2 (Operation S604). Thus, a tunnel (2) between the S-GW and P-GW (2) is set up, and the traffic of the user terminal UE is processed by the P-GW (2).

7. Seventh Exemplary Embodiment

According to a seventh exemplary embodiment of the present invention, an operation policy is set on a control apparatus for controlling a network, and the control apparatus performs network control similar to that of the above-described second exemplary embodiment, in accordance with the operation policy. An example of the operation policy is that predetermined control processing is performed, for example, when the load on a network or server exceeds a predetermined value. More specifically, the control apparatus determines whether or not a failure, an overloaded state or the like has occurred based on network monitoring information and the operation policy and, when any problem occurs, changes the setting of a virtual tunnel and switches the logical path of a network service so that the place where the problem has occurred will be bypassed. Moreover, another conceivable example of the operation policy is that a change to resources in the underlay network as described in the first or second exemplary embodiment above is performed based on the condition that the performance of a service falls to or below a certain value, or the condition that it is a time of day when large changes in the amount of traffic are expected, or the like. Hereinafter, the present exemplary embodiment will be described by taking a system using an extended network service as described in the fifth and sixth exemplary embodiments above as an example.

7.1) System Architecture

Figure 16:
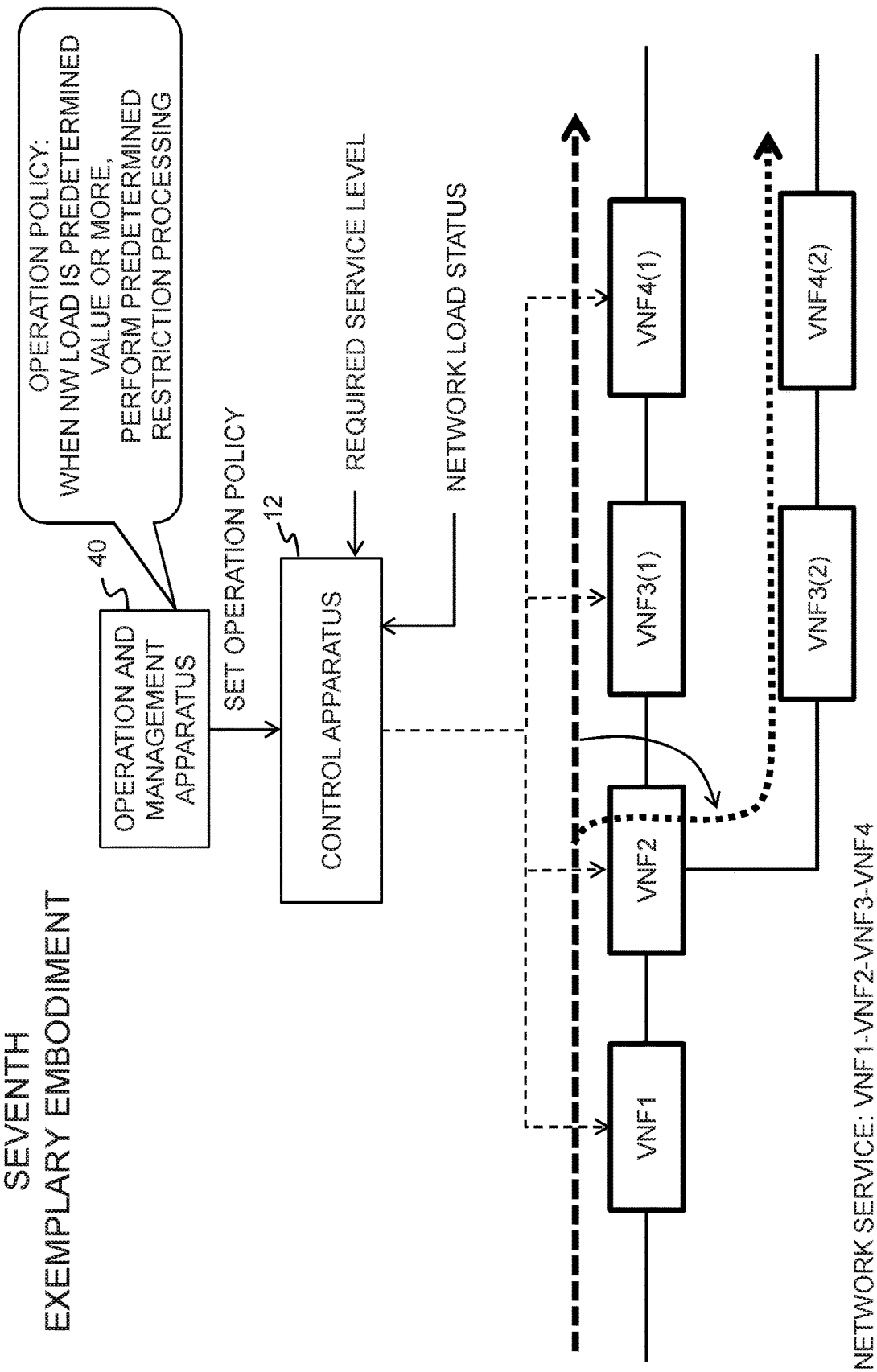
FIG. 16 is a schematic network diagram showing an example of a network system according to a seventh exemplary embodiment of the present invention.

Referring to FIG. 16, in a network system according to the seventh exemplary embodiment of the present invention, an operation and management apparatus 40 sets an operation policy on a control apparatus 12, and the control apparatus 12 controls a network in accordance with the operation policy. The control apparatus 12 basically has the same configuration and functions as the control apparatus 10 shown in FIG. 4, but is different from the fourth exemplary embodiment in that the control apparatus 12 performs policy-based control in accordance with an operation policy stored in a storage device (not shown). The other configuration and functions are similar to those of the above-described fourth exemplary embodiment, and therefore a description thereof will be omitted by using the same reference signs as in FIG. 12. Note that the control apparatus 12 may be provided within the operation and management apparatus 40.

Referring to FIG. 16, when an operation policy is set on the operation and management apparatus 40 by an operator, the control apparatus 12 performs control of a network based on monitoring information from the network, which indicates the load status, and on the operation policy, which is set by the operation and management apparatus 40. As described above, the control apparatus 12 collects the monitoring information from each node in the network to update the database 103. When detecting in accordance with the operation policy that a problem such as a failure or an overloaded state has occurred at a node, the control apparatus 12 instructs a TEP of a node located more upstream than the node suffering the problem to rewrite and set a packet header for a network service or flow to be controlled.

The following are examples of a parameter to be controlled in an operation policy.

Operating ratios of VNF, VM, VMM, and physical server (operating ratio, usage amount, usage ratio, power consumption, or the like of CPU and/or memory)

Communication bandwidth, bandwidth in use, usage ratio, traffic amount, or the like of physical link and virtual tunnel Communication bandwidth, bandwidth in use, usage ratio, traffic amount, or the like of network service Triggered when any of these parameters exceeds or falls below a predetermined threshold, the control apparatus 12 causes the TEP to perform the above-described processing for rewriting the packer header.

7.2) Operation and Management Apparatus

Figure 17:
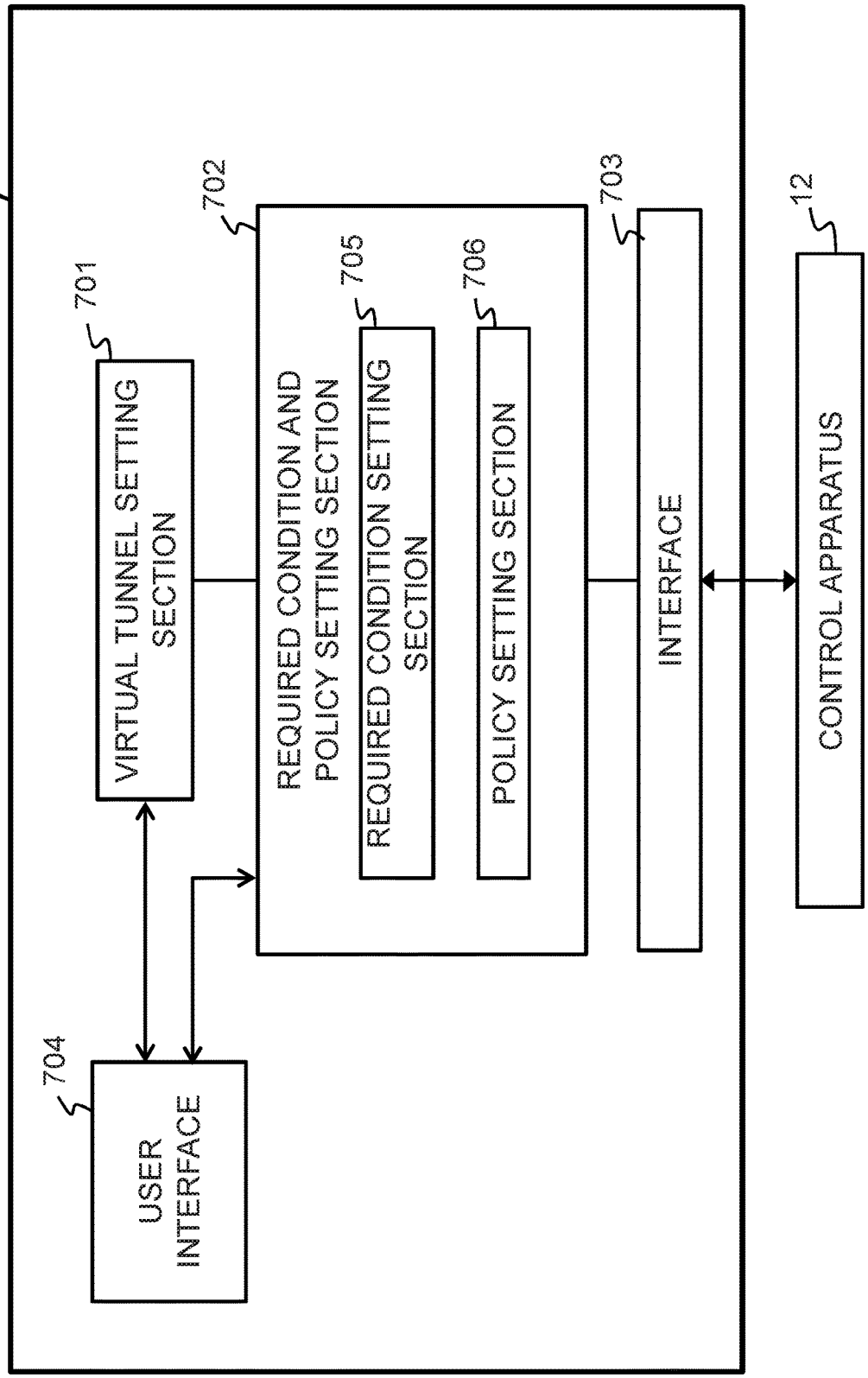
FIG. 17 is a block diagram showing the schematic configuration of an operation and management apparatus in the network system according to the seventh exemplary embodiment.

Referring to FIG. 17, the operation and management apparatus 40 includes a virtual tunnel setting section 701, a required condition and policy setting section 702, an interface 703, and a user interface 704 and, apart from them, includes a control section and a storage section (not shown). The user interface 704 includes an information input section such as a keyboard and an information display section such as a monitor, enabling an operator to set a virtual tunnel, a required condition, and an operation policy, and also enabling an extended network service on a network determined by the control apparatus 12 to be visualized.

The virtual tunnel setting section 701 generates a virtual tunnel based on a network service entered by the operator via the user interface 704. The required condition and policy setting section 702 includes a required condition setting section 705 and a policy setting section 706 and generates a required condition and an operation policy used when configuring a network service based on an input from the operator. Hereinafter, the operation of the operation and management apparatus 40 according to the present exemplary embodiment will be described with reference to FIGS. 18 to 20.

7.3) Visualization of Extended Network Service

Figure 18:
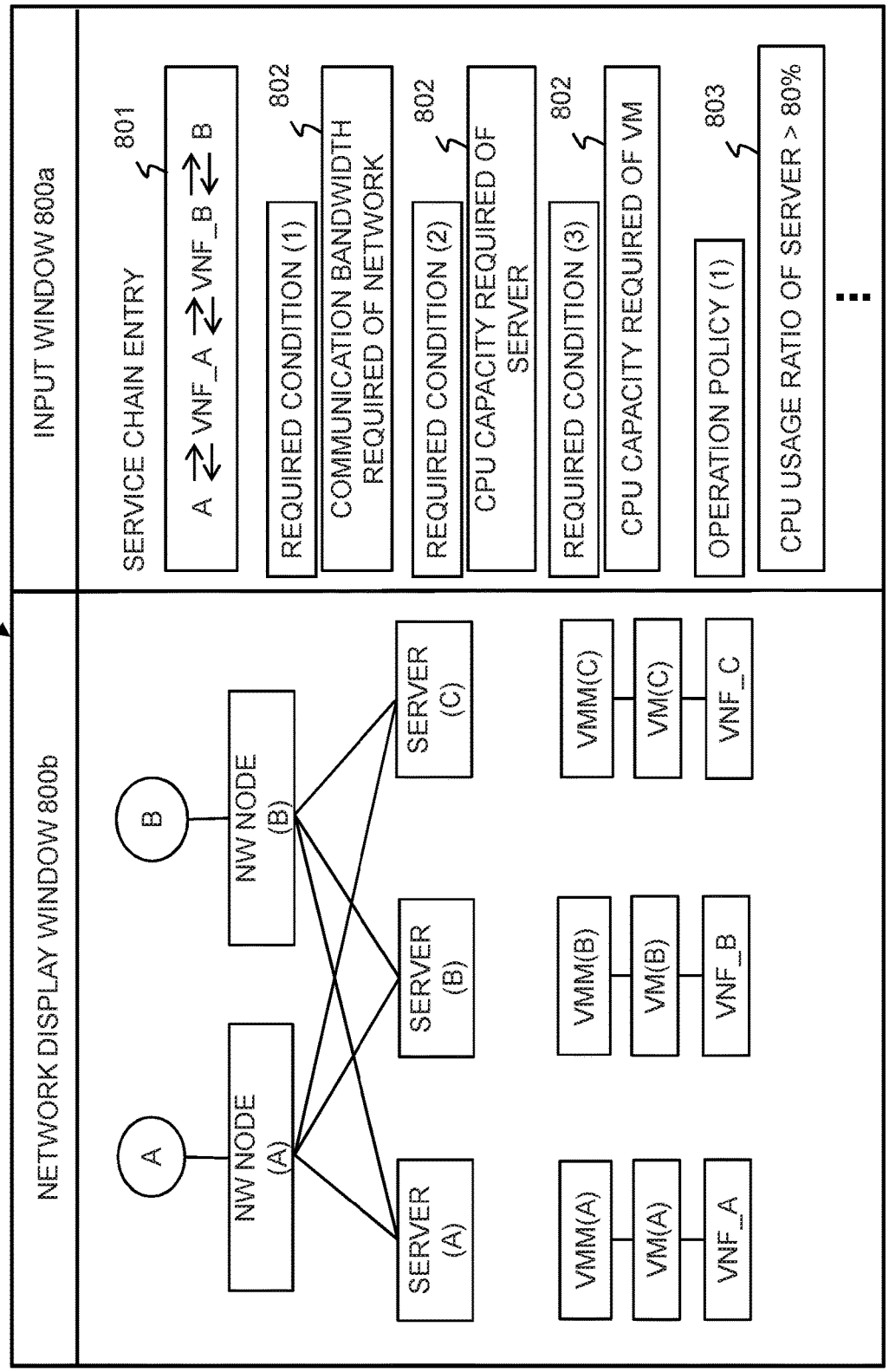
FIG. 18 is a diagram schematically showing a display screen that is an example of network visualization by the operation and management apparatus in the seventh exemplary embodiment.

As illustrated in FIG. 18, an operation and management screen 800 displayed on the user interface 704 is split into an input window 800a and a network display window 800b. A network service (hereinafter, referred to as "service chain") entry field 801, a plurality of required condition entry fields 802, and an operation policy entry field 803 are displayed on the input window 800a, while the physical topology and virtual layer nodes of a network that is the target of operation and management is displayed on the network display window 800b. For example, the operation and management apparatus 40 acquires topology information and virtual layer node information from the database 103 of the control apparatus 12 and displays the physical architecture of the network and the configuration of the virtual layers based on the acquired information.

Referring to FIG. 18, in the network topology displayed as an example on the network display window 800b, each of network nodes A and B is connected to servers A, B and C via physical links. Moreover, three virtual network functions NVF_A, VNF_B and VNF_C can be deployed on each server, and each VNF's lower layers, VM and VMM, are displayed as virtual layer nodes individually. Hereinafter, to simplify the description, it is assumed that the VNF_A is activated on the server (A) and the same VM (B) and VNF_B are activated on each of the servers (B) and (C).

Figure 19:
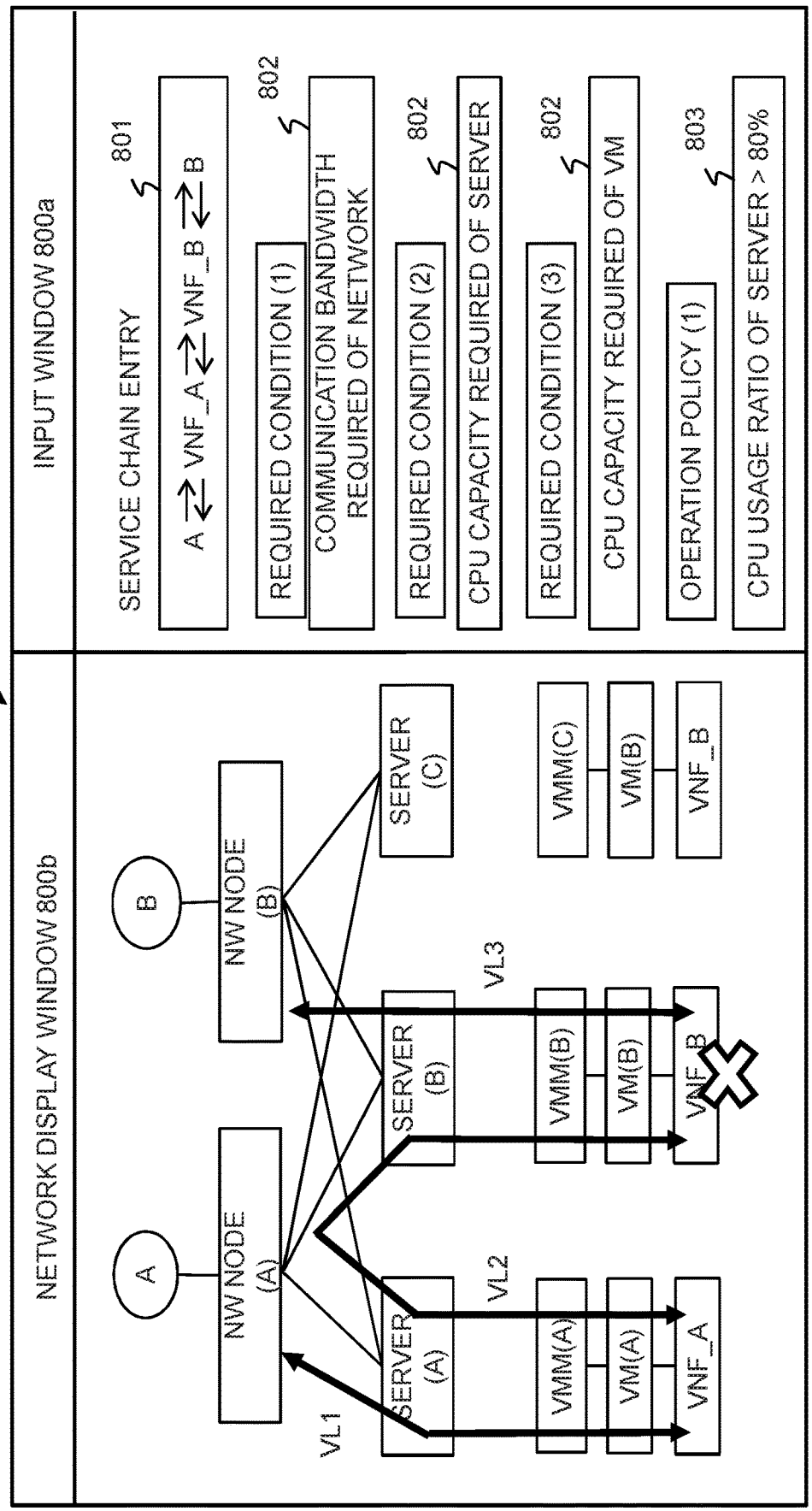
FIG. 19 is a diagram schematically showing a display screen that is an example of service chain visualization by the operation and management apparatus in the seventh exemplary embodiment.

Referring to FIG. 19, it is assumed that an operator enters the following service chain in the service chain entry field 801 via the user interface 704: A⇔VNF_A⇔VNF_B⇔B.

Further, it is assumed that a communication bandwidth required of the network and respective CPU/memory capacities required of the server and VM are entered in the required condition entry fields 802, and that the following operation policy is entered in the operation policy entry field 803: "When the CPU usage ratio of the server >80%, the setting of the service chain shall be changed or the logical path shall be changed."

The required condition and policy setting section 702 sends and sets the above required conditions and operation policy to the control apparatus 12. Based on the required conditions and operation policy set by the operation and management apparatus 40, the control apparatus 12 generates, for example, virtual tunnels VL1, VL2 and VL3 for the extended service chain as follows and sends them to the operation and management apparatus 40.

VL1: Source=NW node (A); Destination=VNF_A
VL2: Source=VNF_A; Destination=VNF_B (server B)
VL3: Source=VNF_B (server B); Destination=NW node (B)

The operation and management apparatus 40 displays the virtual tunnels VL1, VL2 and VL3 for the above extended service chain on the network display window 800b, as shown in FIG. 19. In this state, it is assumed that the VNF_B node falls in an overloaded state, and the CPU usage ratio of its server (B) exceeds 80%.

Upon detecting, from monitoring information from the VNF_B node, VM (B) node, VMM (B) node, and physical server (B) node, that the CPU usage ratio of the server (B) has exceeded 80%, the control apparatus 12 notifies the operation and management apparatus 40 of information on the occurrence of a failure at the VNF_B node, and the operation and management apparatus 40 displays the occurrence of a failure at the VNF_B node on the network display window 800b.

Figure 20:
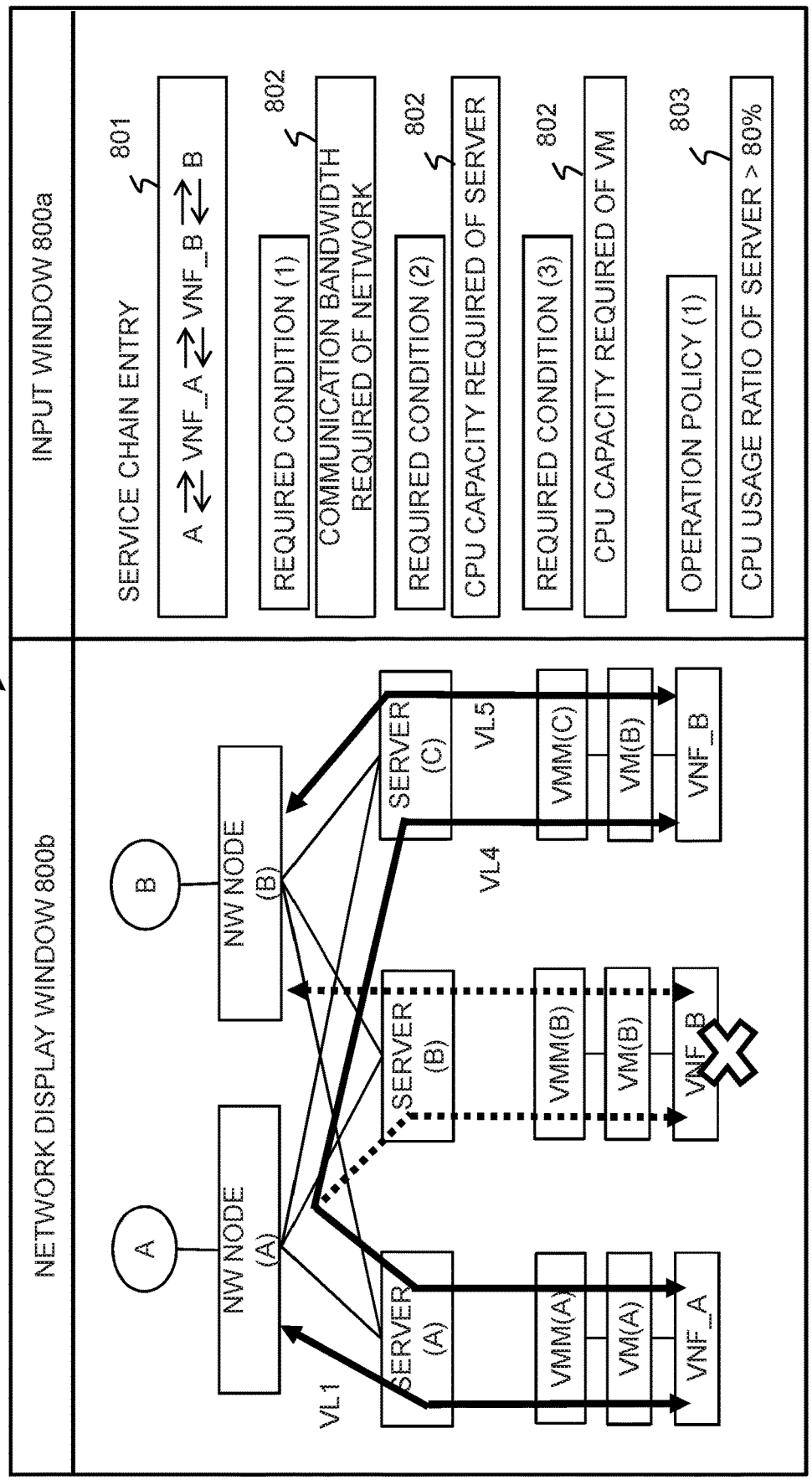
FIG. 20 is a diagram schematically showing a display screen that is another example of service chain visualization by the operation and management apparatus in the seventh exemplary embodiment.

Subsequently, the control apparatus 12 changes TEP setting at a switch of the node (A) preceding the server (B) while referring to the database 103, generates new virtual tunnels VL1, VL4 and VL5 as follows, for example, as shown in FIG. 20 and sends them to the operation and management apparatus 40.

VL1: Source=NW node (A); Destination=VNF_A
VL2: Source=VNF_A; Destination=VNF_B (server C)
VL3: Source=VNF_B (server C); Destination=NW node (B)

Thus, even if a failure occurs at the VNF_B node and its lower-layer nodes on the server (B), the logical path for the extended service chain can be changed by changing TEP setting at the node (A) preceding the server (B).

Note that the same functions as the virtual tunnel setting section 701 and required condition and policy setting section 702 of the operation and management apparatus 40 can also be implemented by using a processor (CPU: Central Processing Unit) for executing programs and storage devices such as a ROM (Read Only Memory) for storing the programs and a RAM (Random Access Memory) for storing information.

8. Other Exemplary Embodiments

Each of the above-described first to seventh exemplary embodiments and examples can also be applied to systems (for example, OpenFlow) in which the control apparatus 11 or 12 controls nodes or physical/virtual switches in a network in units of flows.

Note that "overlay" and "underlay" of the above-described overlay network and underlay network are a relative concept, and may indicate not only a logical network and a physical network but also a higher-order logical network and a lower-order logical network.

While the invention has been particularly shown and described with reference to exemplary embodiments thereof, the invention is not limited to these embodiments. It will be understood by those of ordinary skill in the art that various changes in form and details may be made therein without departing from the sprit and scope of the present invention as defined by the claims.

National Stage of International Application No. PCT/JP2016/001435, filed on Mar. 14, 2016, which claims priority from Japanese patent application no. 2015-061745, filed on Mar. 24, 2015, the disclosure of which is incorporated herein in its entirety by reference.

INDUSTRIAL APPLICABILITY

The present invention can be applied to a system for deploying virtual network functions (VNFs) on a network.

REFERENCE SIGNS LIST

10, 11, 12 Control apparatus
VNF1-VNF3 Virtual network function
N1-N3 Node
SW1-SW5 Physical switch
SV1-SV4 Server
40 Operation and management apparatus
101 Overlay network setup section
102 Node management section
103 Database
104 Network monitor
105 Control section

The invention claimed is:

1. A network control apparatus for controlling a network having a multi-layer structure, comprising:
    a network monitor that monitors whether or not a network service on a first layer fulfills a required service level, a network service path being preset on the first layer, the network service path providing the same virtual network functions as at least part of those of the network service; and
    a controller configured to:
        change, depending on a result of the monitoring, a setting of a packet header so that resources on the first layer will be changed; and
        change the setting of the packet header so that a path on the first layer will be switched to the network service path, depending on the result of the monitoring,
    wherein the resources on a second layer, which is a lower layer than the first layer, are changed in accordance with a change in the setting of the packet header.

2. The network control apparatus according to claim 1, wherein the controller is configured to change the setting of the packet header at an end point of a virtual tunnel connecting virtual network functions for the network service.

3. The network control apparatus according to claim 1, wherein the packet header, the setting of which is changed, is a header added for the first layer.

4. The network control apparatus according to claim 1, wherein the controller is configured to repeat the changing of the setting of the packet header, responsive to determining that the network service after the setting of the packet header is changed does not fulfill the service level.

5. A network control method for controlling a network having a multi-layer structure by a network control apparatus, comprising:
    monitoring whether or not a network service on a first layer fulfills a required service level, a network service path being preset on the first layer, the network service path providing the same virtual network functions as at least part of those of the network service; and
    changing, depending on a result of the monitoring, a setting of a packet header so that resources on the first layer will be changed; and
    changing the setting of the packet header so that a path on the first layer will be switched to the network service path, depending on the result of the monitoring,
    wherein the resources on a second layer, which is a lower layer than the first layer, are changed in accordance with a change in the setting of the packet header.

6. The network control method according to claim 5, wherein the network control apparatus changes the setting of the packet header at an end point of a virtual tunnel connecting virtual network functions for the network service.

7. The network control method according to claim 5, wherein the packet header the setting of which is changed is a header added for the first layer.

8. The network control method according to claim 5, wherein if the network service after the setting of the packet header is changed does not fulfill the service level, the changing of the setting of the packet header is repeated.

9. A network system comprising:
    a network having a multi-layer structure; and
    a control apparatus for controlling the network,
    wherein the control apparatus is configured to:
        monitor whether or not a network service on a first layer fulfills a required service level, a network service path being preset on the first layer, the network service path providing the same virtual network functions as at least part of those of the network service;
        depending on a result of the monitoring, change a setting of a packet header so that resources on the first layer will be changed; and
        change the setting of the packet header so that a path on the first layer will be switched to the network service path, depending on the result of the monitoring,
    wherein the resources on a second layer, which is a lower layer than the first layer, are changed in accordance with a change in the setting of the packet header.

10. The network system according to claim 9, wherein the control apparatus changes the setting of the packet header at an end point of a virtual tunnel connecting virtual network functions for the network service.

11. The network system according to claim 9, wherein the packet header the setting of which is changed is a header added for the first layer.

12. The network system according to claim 9, wherein if the network service after the setting of the packet header is changed does not fulfill the service level, the changing of the setting of the packet header is repeated.

* * * * *